US008516089B2

(12) United States Patent
Johnsen et al.

(10) Patent No.: US 8,516,089 B2
(45) Date of Patent: Aug. 20, 2013

(54) CLUSTER SYSTEM MANAGEMENT

(75) Inventors: Bjorn Dag Johnsen, Oslo (NO); Ola Torudbakken, Oso (NO); Andreas Bechtolsheim, Menlo Park, CA (US)

(73) Assignee: Oracle America, Inc., Redwood Shores, CA (US)

( * ) Notice: Subject to any disclaimer, the term of this patent is extended or adjusted under 35 U.S.C. 154(b) by 140 days.

(21) Appl. No.: 12/124,686

(22) Filed: May 21, 2008

(65) Prior Publication Data

US 2008/0320117 A1 Dec. 25, 2008

Related U.S. Application Data

(60) Provisional application No. 60/945,778, filed on Jun. 22, 2007.

(51) Int. Cl.
*G06F 15/177* (2006.01)
(52) U.S. Cl.
USPC .......................................................... 709/221
(58) Field of Classification Search
USPC .......................................... 715/734; 709/221
See application file for complete search history.

(56) References Cited

U.S. PATENT DOCUMENTS

| 6,269,076 | B1* | 7/2001 | Shamir et al. ................. 370/217 |
| 7,039,922 | B1* | 5/2006 | Shah et al. .................... 719/326 |
| 7,315,985 | B1* | 1/2008 | Gauvin et al. ................ 715/734 |
| 2003/0142628 | A1 | 7/2003 | Alonso et al. |
| 2004/0103218 | A1* | 5/2004 | Blumrich et al. ............. 709/249 |
| 2005/0083854 | A1 | 4/2005 | Nagarajrao et al. |
| 2006/0004909 | A1* | 1/2006 | Takuwa et al. ................ 709/203 |
| 2006/0053337 | A1* | 3/2006 | Pomaranski et al. ............. 714/4 |
| 2006/0187914 | A1* | 8/2006 | Gumaste et al. .............. 370/389 |
| 2006/0271677 | A1 | 11/2006 | Mercier et al. |
| 2007/0044077 | A1* | 2/2007 | Srivastava et al. ............ 717/126 |
| 2007/0058657 | A1* | 3/2007 | Holt et al. ..................... 370/438 |

FOREIGN PATENT DOCUMENTS

WO 02089418 A1 11/2002

OTHER PUBLICATIONS

Yung-Chin Fang et al.; High-Performance Clusters: Out-of-Band Management Approaches; Published Apr. 2001; Retrieved from http://www.dell.com/content/topics/global.aspx/power/en/ps4q01_beowulf?c=us&l=en.*
Cisco IOS releases 12.0(5)WC4 and 12.0(5)WC5, Catalyst 2900 Series XL and Catalyst 3500 Series XL Software Configuration Guide, May 2002, pp. 1-368, Retrieved from Retrieved from http://liveweb.archive.org/http://www.cisco.com/en/US/docs/switches/lan/catalyst2900xl_3500xl/release12.0_5_wc5/swg/swg.pdf.*

* cited by examiner

*Primary Examiner* — Chau Le
(74) *Attorney, Agent, or Firm* — Park, Vaughan, Fleming & Dowler, LLP

(57) ABSTRACT

In a system having a cluster of system components interconnected by a cluster interconnect fabric, the system components include out-of-band management network interfaces to an out-of-band management network. The system is configured to use the cluster interconnect fabric and the out-of-band management network interfaces to determine the overall connectivity and status of the cluster.

20 Claims, 27 Drawing Sheets

FIG. 1

CLUSTER SYSTEM MANAGEMENT

This application hereby claims priority under 35 U.S.C. §119 to U.S. Provisional Patent Application No. 60/945,778, filed on 22 Jun. 2007, entitled "COMMUNICATION SYSTEMS". The present application hereby incorporates by reference the above-referenced provisional patent application.

BACKGROUND

The invention relates to cluster systems and to the management of a cluster system.

Traditionally, clustered systems of stand-alone server nodes have verified node-node connectivity based on being able to reach identified peer nodes via the data network (cluster interconnect fabric). As long as the list of (potential) member nodes is part of persistent cluster configuration information, this checking can take place initially at cluster definition time, and then be part of the normal run-time monitoring of the overall state of the cluster and the individual member nodes.

If communication is not possible for some node combination(s), then this will typically be reported, and an operator will have to verify both correct connectivity as well as the state of both nodes and interconnect components. At cluster definition (construction) time, this will typically be part of a procedure for verifying correct wiring and configuration.

In a complex system, a cluster interconnect structure can be complex both in terms of number of cables and connectors as well as in terms of the number of individual nodes, adapters and switches. For example, configurations can vary from simple two-node clusters to complex topologies with thousands of end-nodes.

Also, it may be necessary to perform a significant number of operations on a large number of individual components to determine state and/or verify connectivity. Hence, for any such cluster interconnect system, simplified and automated verification of correct connectivity and associated trouble shooting is desirable in order to maximize availability and minimize maintenance costs. This applies when a physical configuration is constructed initially, when dynamic connectivity changes take place due to component faults or operator generated errors, as well as when a configuration is being expanded or upgraded.

The ability to communicate between any relevant pairs of nodes does not inherently imply that the correct connectivity in terms of optimal topologies and path independence has been achieved. Hence, more sophisticated verification of the interconnect structure is required in order to make sure that the cluster is configured (physically and logically) according to rules of "best practice" for the relevant set of nodes.

In addition, new techniques for logical partitioning and virtualization at both the physical server node level as well as within the interconnect fabric significantly add to the complexity associated with constructing and maintaining cluster configurations. Among other things, this imposes a need to distinguish between physical ("mechanical") connectivity in terms of cables and connectors between switches and (physical) cluster nodes and the logical connectivity in terms of which hosts (logical nodes) are able to communicate.

The present invention seeks to provide for improved management and diagnosis of cluster-based systems.

SUMMARY

An aspect of the invention can provide a system comprising a cluster of system components interconnected by a cluster interconnect fabric, the system components further comprising out-of-band management network interfaces to an out-of-band management network. The system can be configured to use the cluster interconnect fabric and the out-of-band management network interfaces to determine the overall connectivity and status of the cluster.

An embodiment of the invention can provide both in-band and out-of-band based management. In an example embodiment, for example, use can be made of dedicated management network(s) (logical or physical) to which servers and other data center equipment (e.g., switches and routers for both the generic data network(s) as well as for the dedicated cluster fabrics/networks) are connected. As a result, nodes and switches for a cluster configuration can communicate using out-of-band traffic on the management network as well as in-band traffic on the data network (cluster fabric).

An embodiment of the invention can provide a system comprising at least two subsystems interconnected via cables representing various communication media types, the system being operable to perform IP based management traffic transparently over a range of such media types.

A computer readable medium can be provided that includes program instruction operable to control one or more processors to carry out such a method.

An aspect of the invention can provide a method of configuring a system comprising a cluster of system components interconnected by a cluster interconnect fabric, which system components further comprise out-of-band management network interfaces to an out-of-band management network. The method can include using the cluster interconnect fabric and the out-of-band management network interfaces to determine the overall connectivity and status of the cluster.

Although various aspects of the invention are set out in the accompanying independent and dependent claims, other aspects of the invention include any combination of features from the described embodiments and/or the accompanying dependent claims, possibly with the features of the independent claims, and not solely the combinations explicitly set out in the accompanying claims.

BRIEF DESCRIPTION OF THE DRAWINGS

Specific embodiments are described by way of example only with reference to the accompanying Figures in which:

FIG. 1 is a schematic representation of the rear of an example switch chassis;

Figure 2:
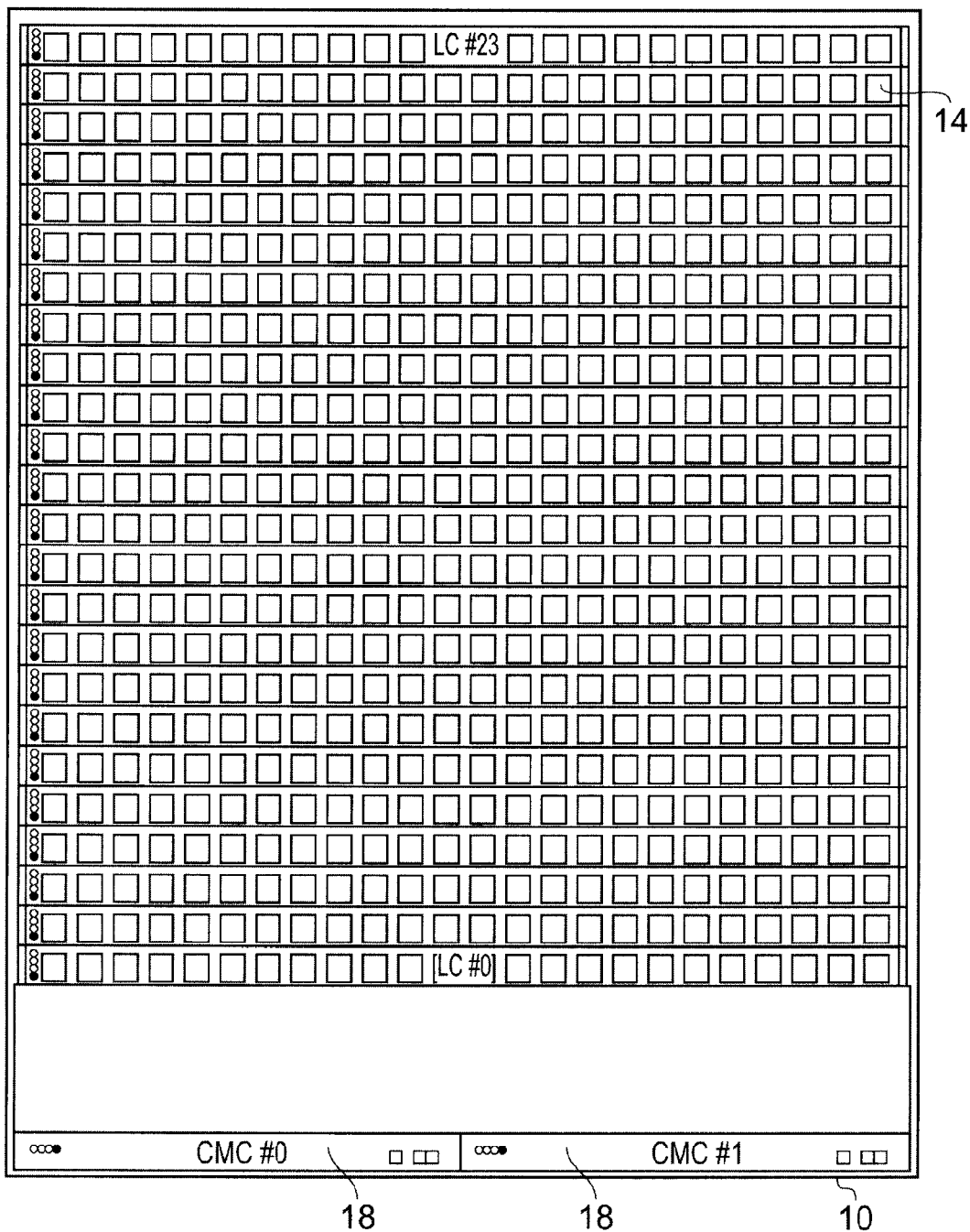
FIG. 2 is a schematic representation of the front of the example switch chassis.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention.

DETAILED DESCRIPTION

An example embodiment of a 3456-port InfiniBand 4x DDR switch in a custom rack chassis is described, with the switch architecture being based upon a 5-stage CLOS fabric. The rack chassis can form a switch enclosure.

The CLOS network, first described by Charles Clos in 1954, is a multi-stage fabric built from smaller individual switch elements that provides full-bisectional bandwidth for all end points, assuming effective dispersive routing.

Given that an external connection (copper or fiber) costs several times more per port than the silicon cost, the key to make large CLOS networks practical is to minimize the number of external cables required and to maximize the number of internal interconnections. This reduces the cost and increases the reliability. For example, a 5-stage fabric constructed with switching elements of size (n) ports supports $(n*n/2*n/2)$ edge points, using $(5*n/2*n/2)$ switch elements with a total of $(3*n*n/2*n/2)$ connections. The ratio of total to external connections is 5:1, i.e. 80% of all connections can be kept internal. The switch elements (switch chips) in the described example can be implemented using a device with 24 4x DDR ports.

An example switch uses a connector that support 3 4x ports per connector, which can further to minimize a number of cables needed. This can provides a further 3:1 reduction in the number of cables. In a described example, only 1152 cables $(1/3*n*n/2*n/2)$ are required.

In contrast if prior commercially available 288-port switches and 24-port switches were used to create a 3456-port fabric a total of 6912 cables $(2*n*n/2*n/2)$ would be required.

The example switch can provide a single chassis that can implement a 5-stage CLOS fabric with 3456 4x DDR ports. High density external interfaces can be provided, including fiber, shielded copper, fiber and twisted pair copper. The amount of cabling can be reduced by 84.4% when compared to building a 3456-port fabric with commercially available 24-port and 288-port switches. In the present example, an orthogonal midplane design can be provided that is capable of DDR data rates.

An example switch can address a full range of HPC cluster computing from a few hundred to many thousand of nodes with a reliable and cost-effective solution that uses fewer chassis and cables than prior solutions.

Figure 1:
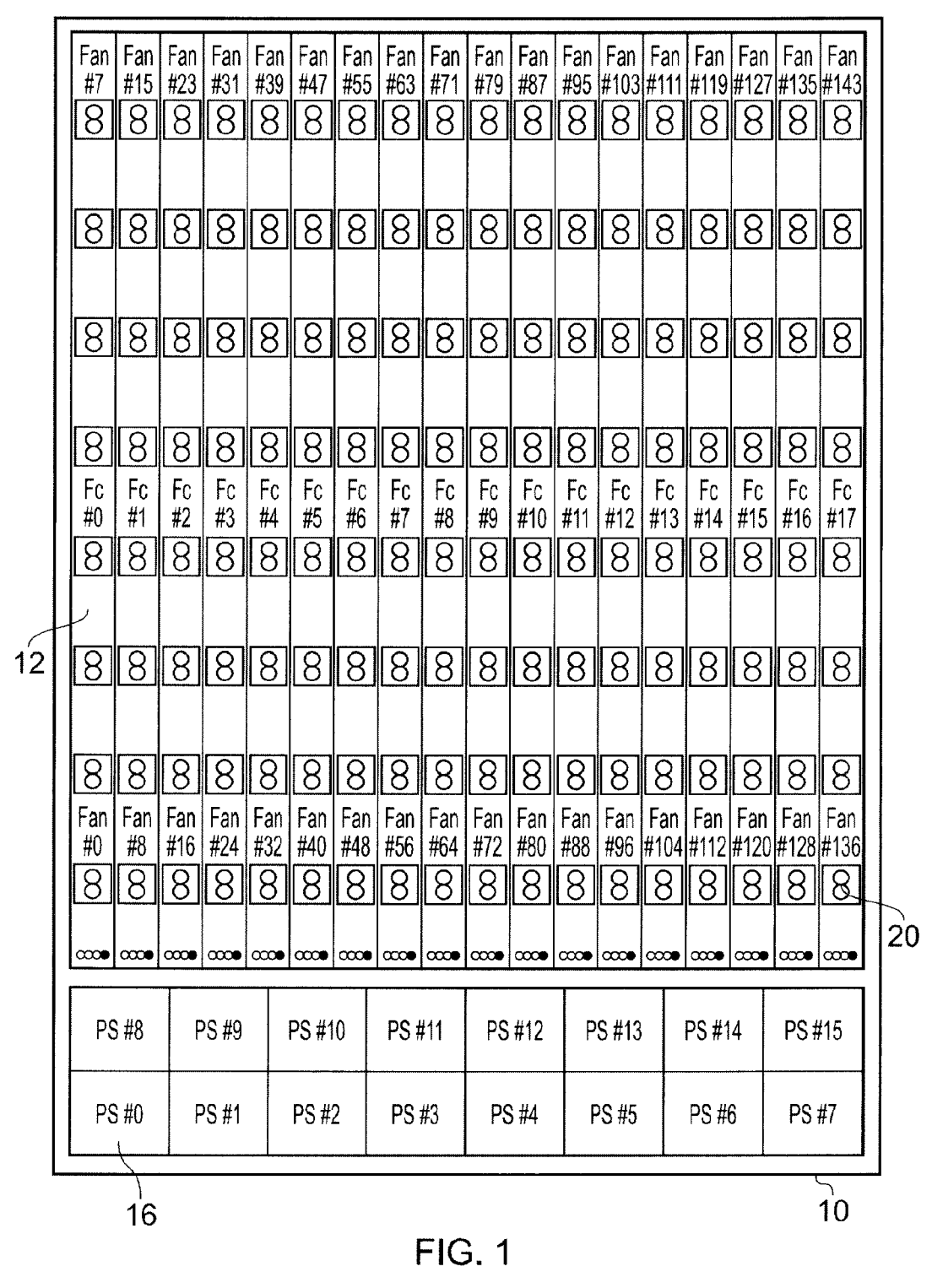

FIGS. 1 and 2 are schematic diagrams of an example of a switch chassis as viewed from the rear (FIG. 1) and front (FIG. 2), respectively. This example comprises a custom rack chassis 10 that is 60" high, 47" wide, and 36" deep, not including a cable management system. The present example provides a passive orthogonal midplane design (not shown in FIGS. 1 and 2) that provides a direct interface between Line Cards (LC) 12 and Fabric Cards (FC) 14. The line cards provide connections to external lines and the fabric card form switch fabric cards for providing switching functions.

In the present example, up to 18 fabric cards (FC0 to FC17) 12, FIG. 1 are provided. Each fabric card 12 plugs vertically into the midplane from the rear.

In the present example, up to 24 line cards (LC0 to LC23) 14, FIG. 2 can be provided. Each line card provides 144 4x ports (24 stacked 168-circuit cable connectors). Each line card plugs horizontally into the midplane from the front.

Up to 16 hot-pluggable power supply units (PS0-PS16) 16, FIG. 1 are each plugged into the chassis 10 from the rear. Each power supply unit 16 has an alternating current (AC) power supply inlet (not shown). The power supply units 16 plug into a power distribution board (PDB), which is not shown in FIGS. 1 and 2. Two busbars (not shown in FIGS. 1 and 2), one per group of 8 power supply units, distribute direct current (DC) supply to the line cards 12 and the fabric cards 14.

Two hot-pluggable Chassis Management Controllers (CMCs) 18, FIG. 2 plug into the power distribution board from the front. Each chassis management controller 18 comprises a mezzanine card.

The power distribution board is a passive power distribution board that supports up to 16 power supply units DC connectors and 2 chassis management controller slot connectors. The power distribution board connects to the midplane through ribbon cables that carry low-speed signals.

In the present example, up to 144 fan modules (Fan#0-Fan#143) 20 are provided, with 8 fan modules per fabric card 12 in the present instance. Cooling airflow is controlled to be from the front to the rear, using redundant fans on the fabric cards to pull the air from the line cards 14 through openings (not shown in FIGS. 1 and 2), in the midplane. The power supply units 16 have their own fans for cooling with the air exiting through the rear of the chassis. The power supply units 18 are also used to cool the chassis management controllers 18.

Figure 3:
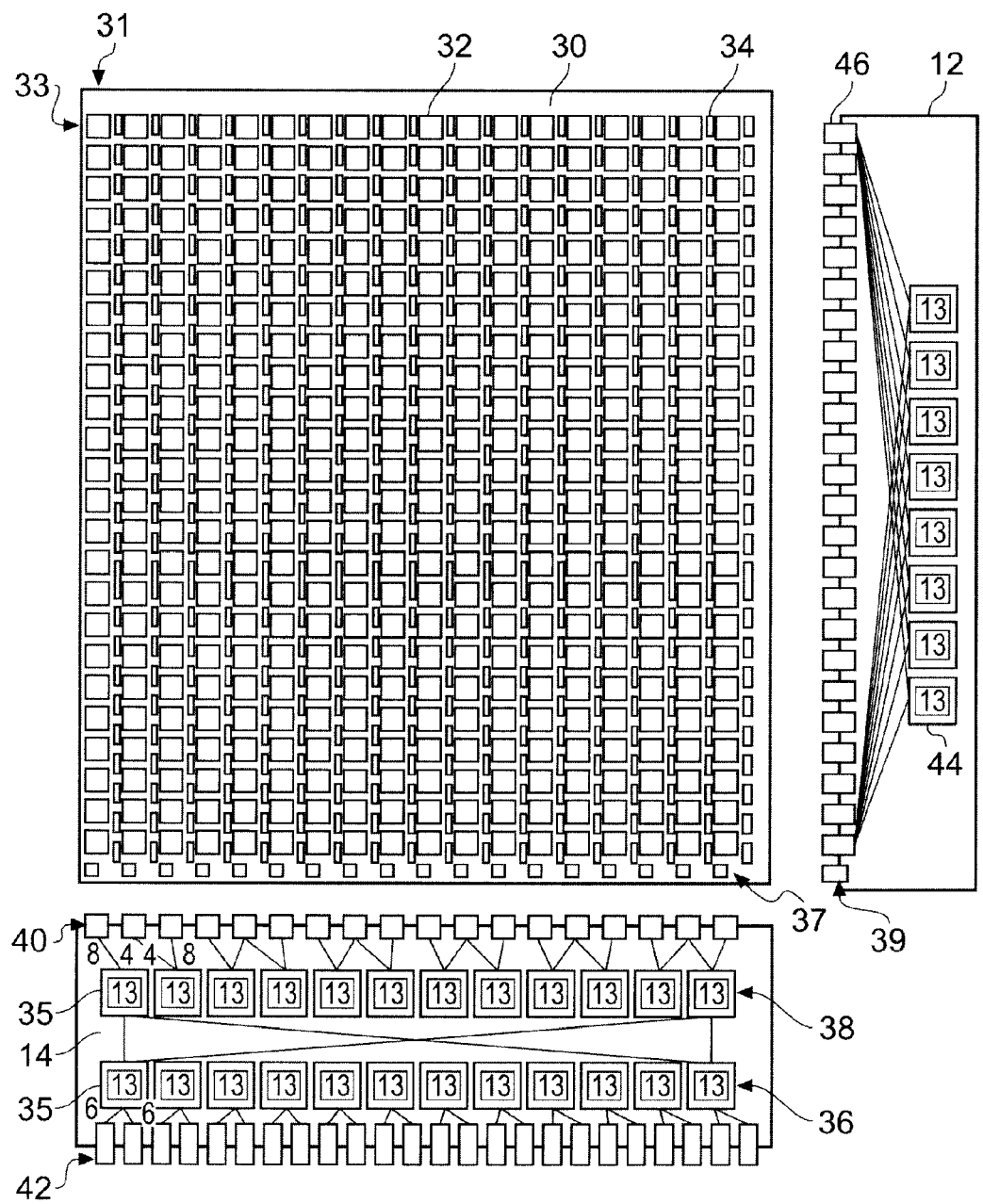
FIG. 3 is a schematic representation of a midplane illustrating the logical connectivity through the midplane between cards at the rear and cards at the front orientated orthogonally with respect to each other.

FIG. 3 is a schematic representation of a printed circuit board 30, which is configured as a midplane 30 in the switch chassis 10. The midplane 30 is configured in an orthogonal manner such that each fabric card 12 can connect to each of the line cards 14 without requiring any signal traces on the midplane 30. The orthogonal midplane design can provide excellent signal integrity in excess of 10 Gbps per differential pair.

The midplane 30 is represented schematically to show an array of midplane connector pairs 32 as black squares with ventilation openings shown as white rectangles. Each midplane connector pair 32 comprises a pair of connectors (to be explained in more detail later) with one connector on a first face of the midplane and a second connector on the other face of the midplane, the first and second connectors being electrically interconnected by way of pass-through vias (not shown in FIG. 3) formed in the midplane 30. As will be explained later, the first and second connectors of a midplane connector pair 32 are each multipath connectors. They are arranged orthogonally with respect to one another such that a first midplane connector of a midplane connector pair 32 is connectable to a fabric card 12 on a first side of the plane 30 in a first orientation and a second midplane connector of the midplane connector pair 32 is connectable to a line card on a second side of the plane 30 in a second orientation substantially orthogonally to the first orientation.

In an example described herein, each of the first connectors of the respective midplane connector pairs 32 of a column 31 of midplane connector pairs 32 can be connected to one fabric card 12. This can be repeated column by column for successive fabric cards 12. In an example described herein, each of the second connectors of the respective midplane connector pairs 32 of a row 33 of midplane connector pairs 32 can be connected to one line card 14. This can be repeated row by row for successive line cards 14. As a result, the midplane can be populated by vertically oriented fabric cards 12 on the first side of the midplane and horizontally orientated line cards 12 on the second side of the midplane 30.

In the present example the midplane 30 provides orthogonal connectivity between fabric cards 12 and the line cards 14 using orthogonal connector pairs. Each orthogonal connector pair provides 64 differential signal pairs, which is sufficient to carry the high-speed signals needed as well as a number of low-speed signals. The orthogonal connector pairs are not shown in FIG. 3, but are described later.

The midplane 30 is also configured to provide 3.3 VDC standby power distribution to all cards and to provide I2C/System Management Bus connections for all fabric cards 12 and line cards 14.

Another function of the midplane 30 is to provide thermal openings for a front-to-rear airflow. The white holes in FIG. 3 (e.g., hole 34) form openings 34 in the midplane for airflow. In this example the midplane is approximately 50% open for airflow.

The fabric cards 12 each support 24 connectors and the line cards 14 each support 18 connectors.

FIG. 3 also illustrates an example of how the fabric cards 12, the midplane 20 and the line cards 14 interconnect. In this example there are 24 switch chips on a line card 14 and 8 chips on each of the 18 fabric cards 12.

As previously mentioned a 5-stage Clos fabric has a size n*n/2*n/2 in which n is the size of the switch element. The example switch element in FIG. 3 has n equal to 24 ports. Each line card 14 has 24 chips in 2 rows with 12 chips in each row. Each of 12 ports of each switch chip 35 in a first row 36 of the line card 14 is connected to 2 cable connectors 42, with 6 ports per cable connector. There are a total of 24 cable connectors per line card 14. Each cable connector can accommodate two physical independent cables that each carries 3 ports (links). Each cable connector 42 can accommodate 6 ports. The remaining 12 ports of each switch chip 35 in the first row 26 is connected to one chip 35 each in a second row 38 of chips 35.

There are 18 midplane connectors 32 per line card 14. Each midplane connector 32 provides one physical connection to one fabric card 14. Each midplane connector 32 can accommodate 8 4x links (there are 8 differential pairs per 4x link and a total of 64 differential pairs provided by the orthogonal connector)

12 ports of each of the switch chips 35 in the second row 38 of the line card 14 are connected to 2 line card connectors 40 that are used to connect the line card 14 to the midplane connectors 32 and thereby with the fabric cards 12 through the orthogonally oriented midplane connector pair. Of the 12 ports per switch chip 35, eight ports are connected to one line card connector 40, and the remaining four ports are connected to another line card connector 40 as represented by the numbers 8 and 4 adjacent the two left hand switch chips 35 in the second row 38. 2 switch chips are thereby connected to a group of 3 line card connectors 40 and hence to a group of three midplane connectors pairs 32.

The remaining 12 ports of each switch chip 35 in the second row 38 of the line card 14 are connected to each of the 12 switch chips 35 in the first row 36 of the line card 14.

At the fabric card 12 all links through an orthogonally oriented midplane connector pair 32 are connected to one line card 14. A single orthogonal connector 46 carries 8 links. These links are connected to one switch element 44 each at the fabric card 12.

Also shown in FIG. 3 are power connectors 37 on the midplane and power connectors 39 on the fabric cards 12.

There has been described a system with 24 line cards with 144 ports each, realized through 48 physical cable connectors that each carry 3 links. The switch fabric structure of each line card 14 is fully connected, so the line card 14 itself can be viewed upon as a fully non-blocking 144 port switch. In addition each line card 14 has 144 links that are connected to 18 fabric cards. The 18 fabric cards then connect all the line cards 14 together in a 5-stage non-blocking Clos topology.

Figure 4A:
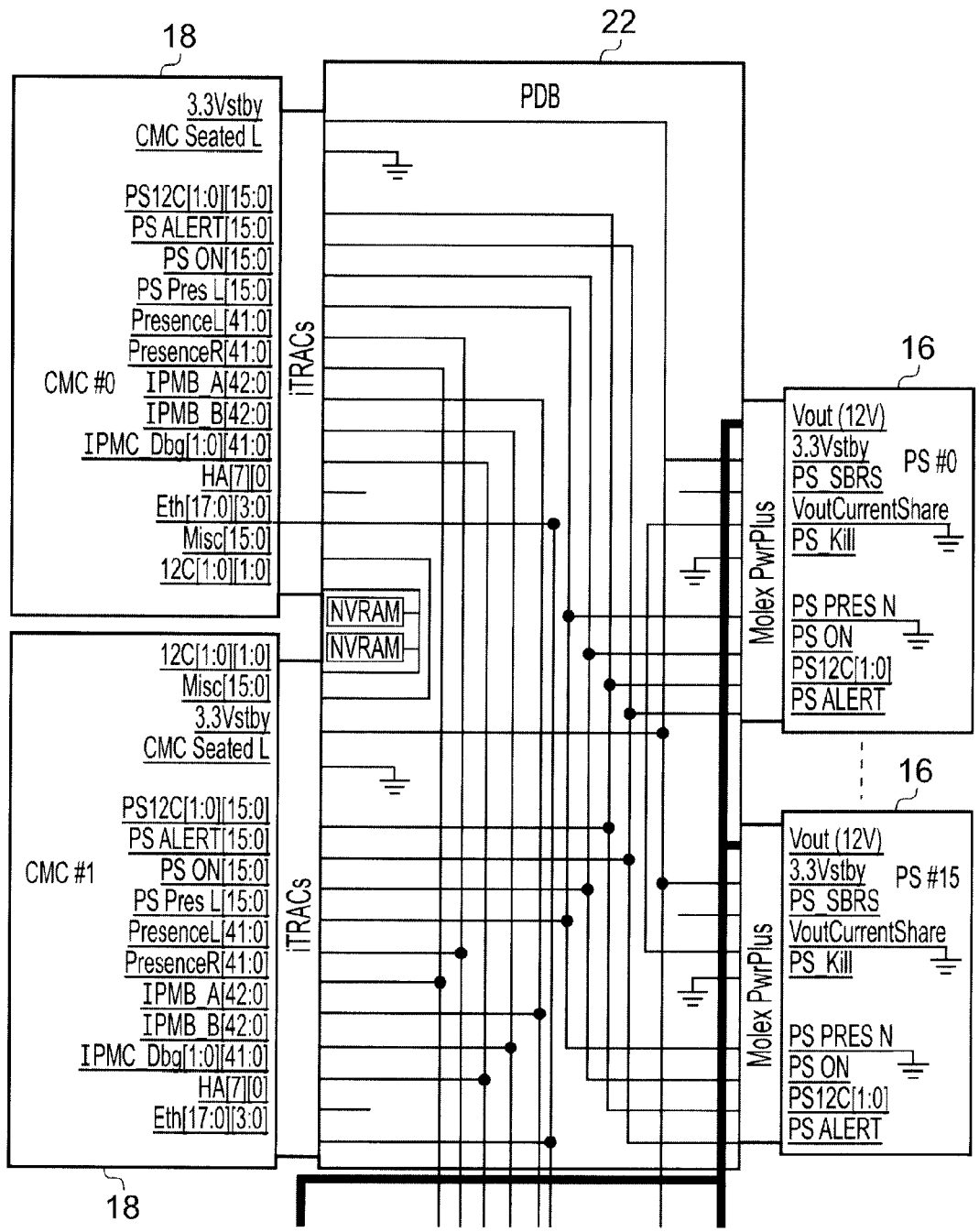
FIG. 4A is a schematic diagram of an example management infrastructure.
Figure 4B:
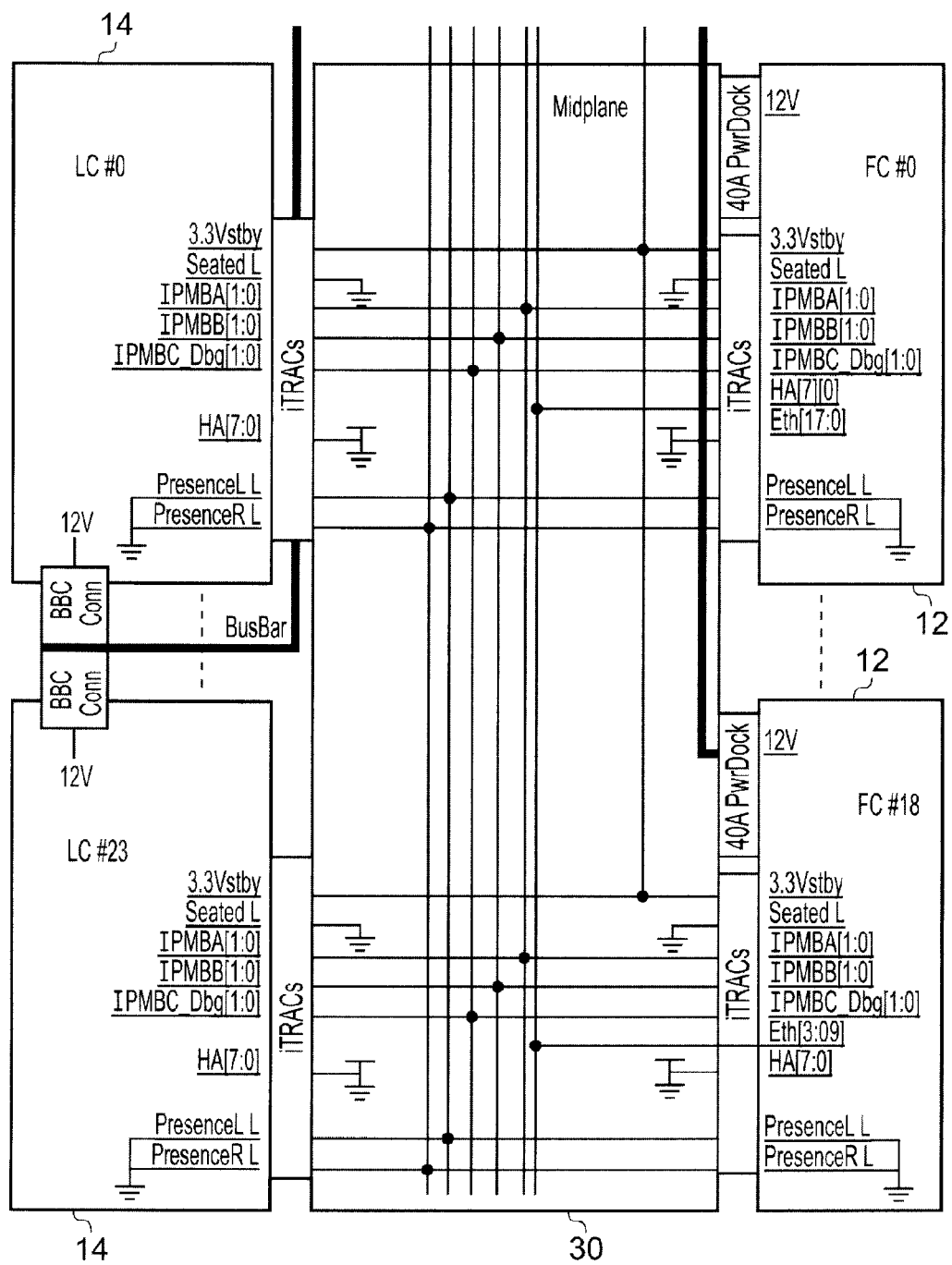
FIG. 4B continues the schematic diagram of FIG. 4A.

FIGS. 4A and 4B are schematic diagrams of an example management infrastructure. This example provides redundant chassis management controllers 18. In addition each fabric card 12 and line card 14 supports an management controller. There are redundant management connections from each chassis management controller 18 to each of the fabric card and line card management controllers. In addition there are I2C connections to each of the power supply units 16. The management connections pass between the fabric cards 12, the line cards 14, the power supply units 16 and the chassis management cards 18 via the midplane and the power distribution board 22 in the present example.

FIGS. 5 to 11 provide various schematic views of an example of a switch chassis in accordance with the invention.

Figure 5:
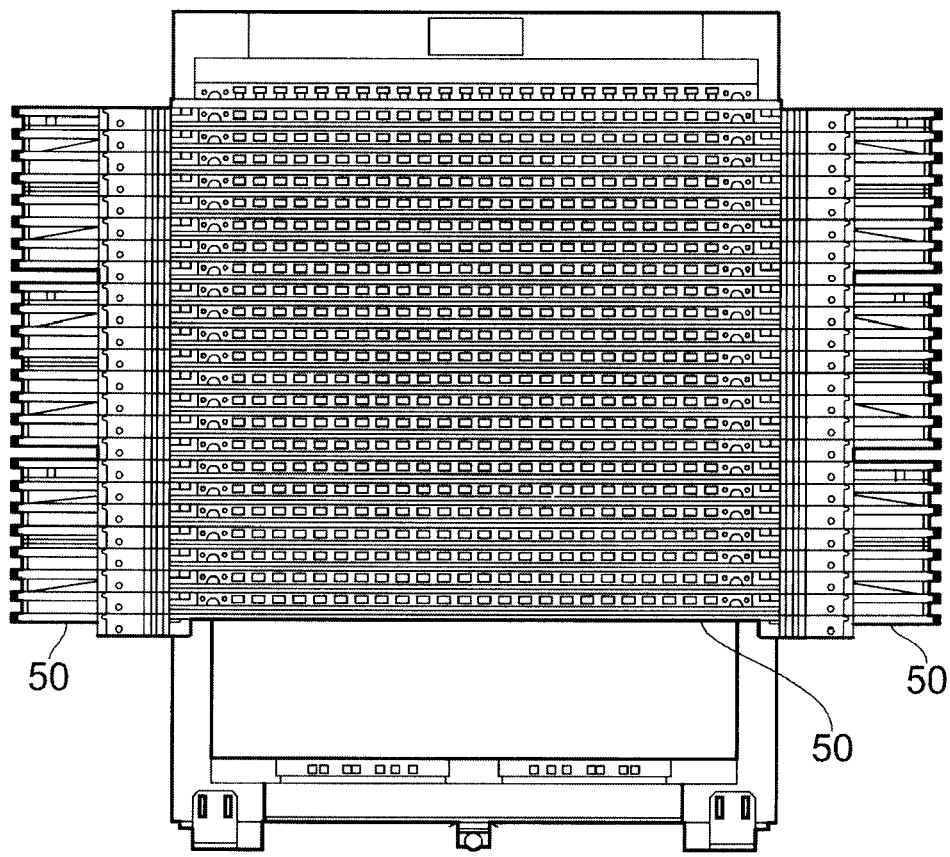
FIGS. 5 to 11 are views of an example of a switch chassis.
Figure 6:
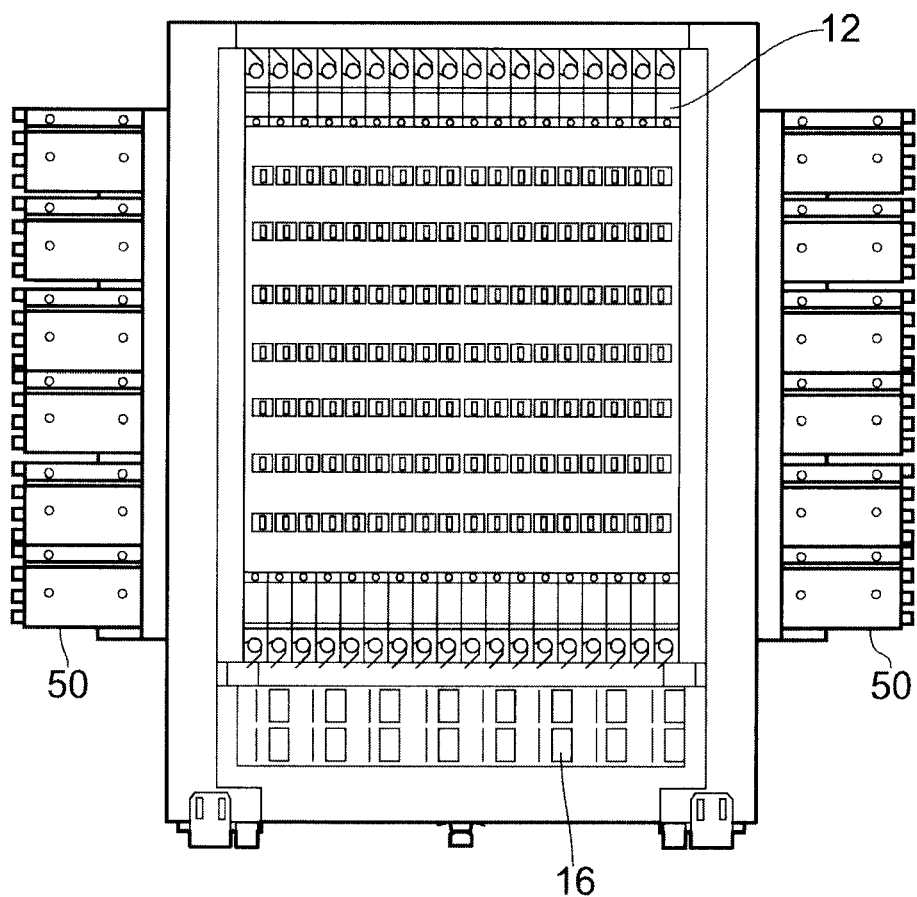
Figure 7:
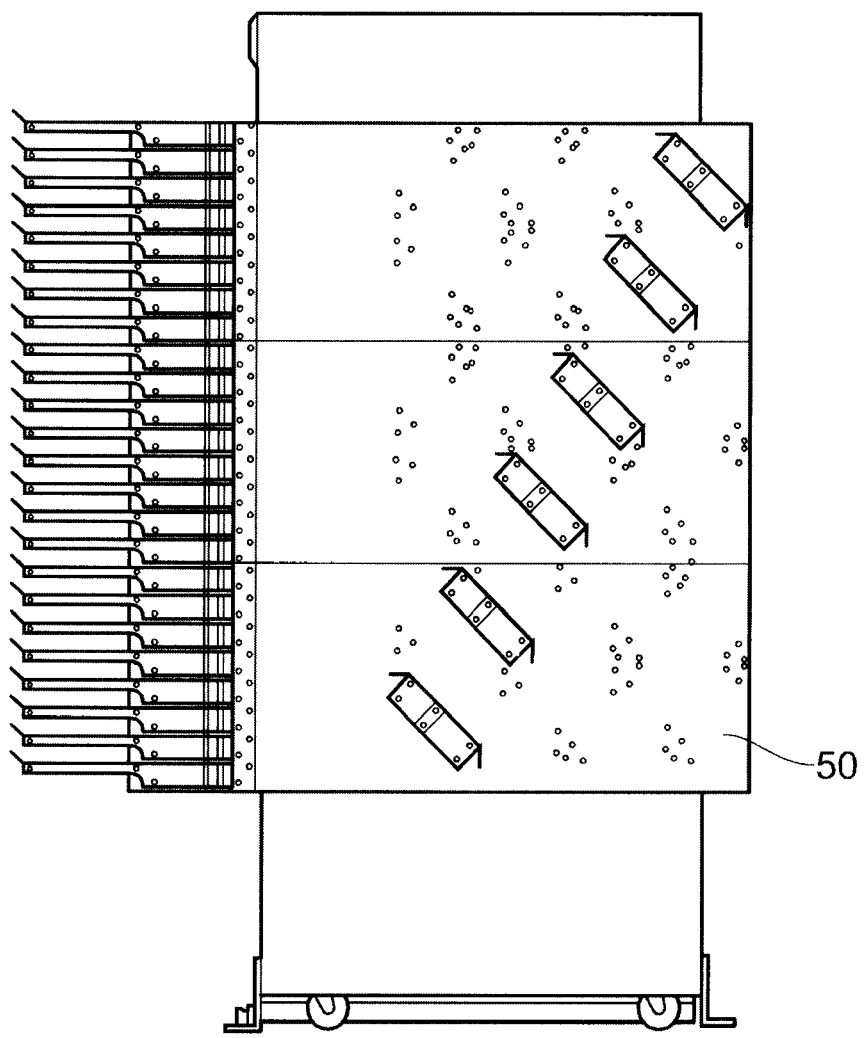
Figure 8:
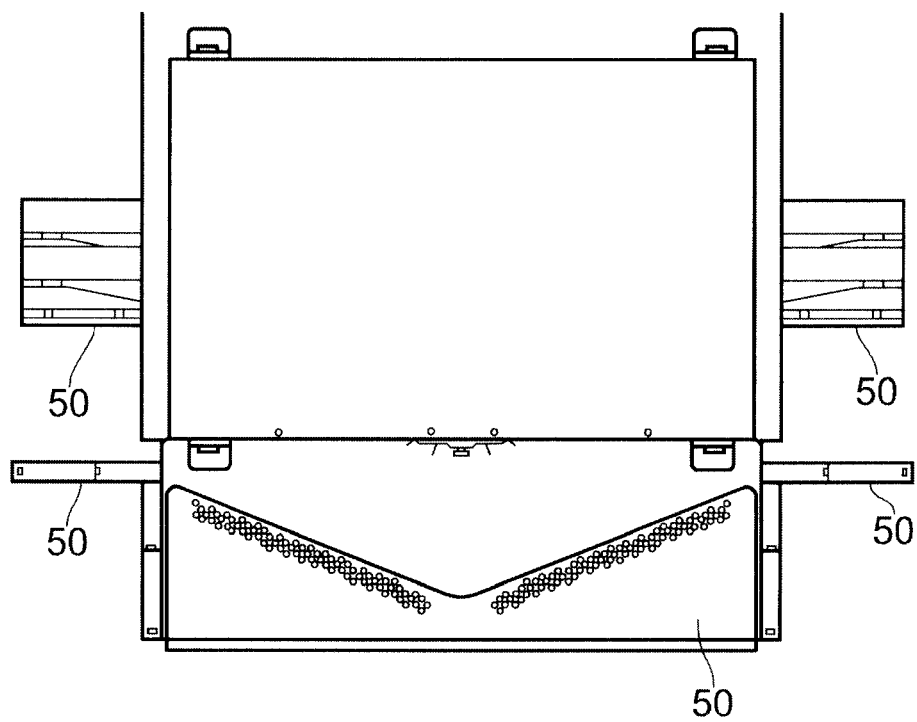
Figure 9:
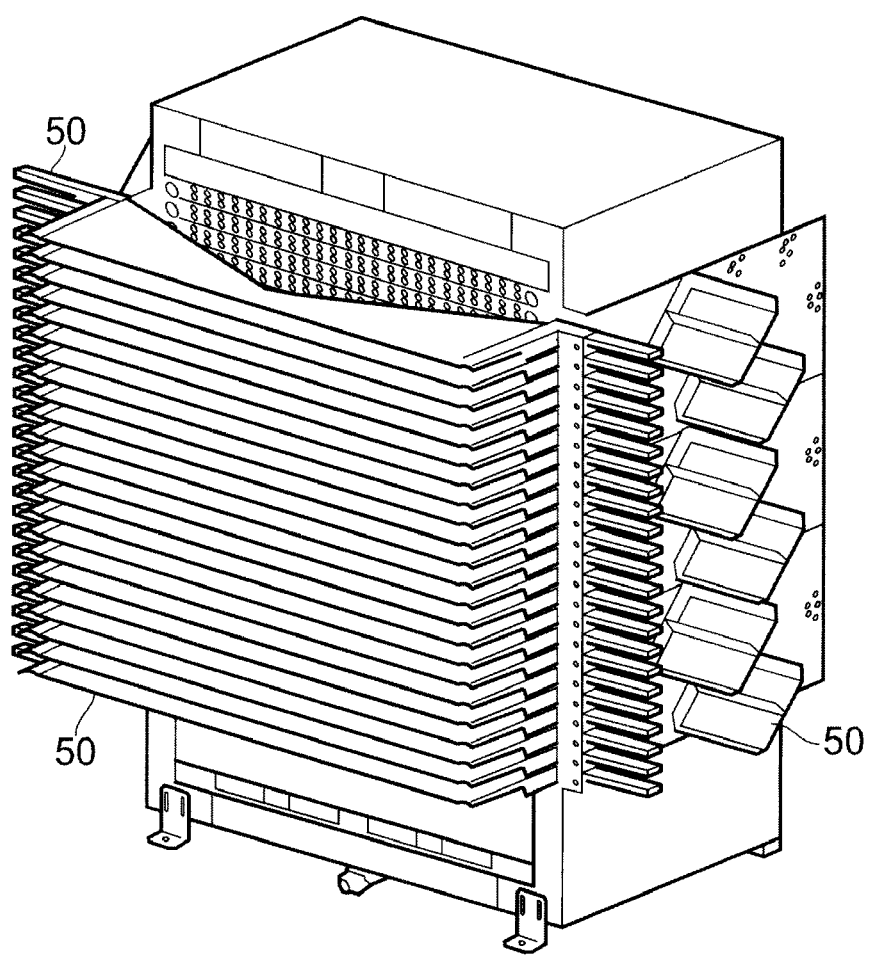
Figure 10:
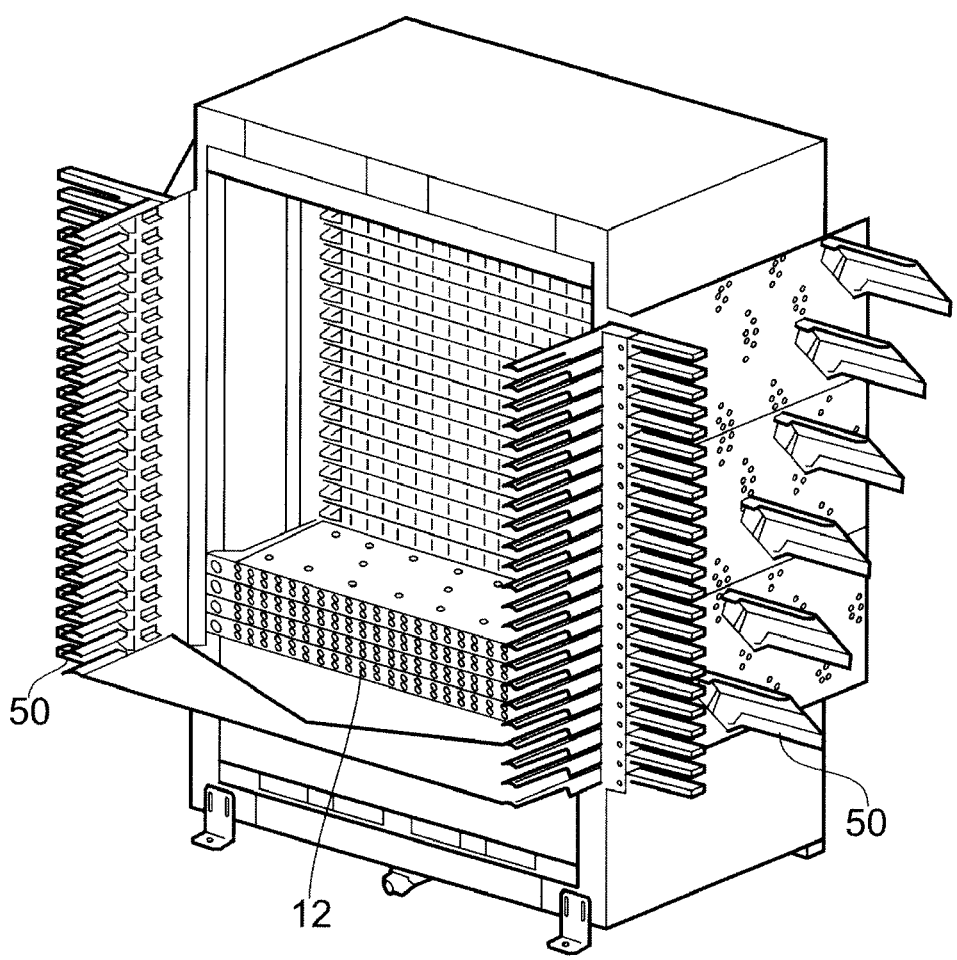
Figure 11:
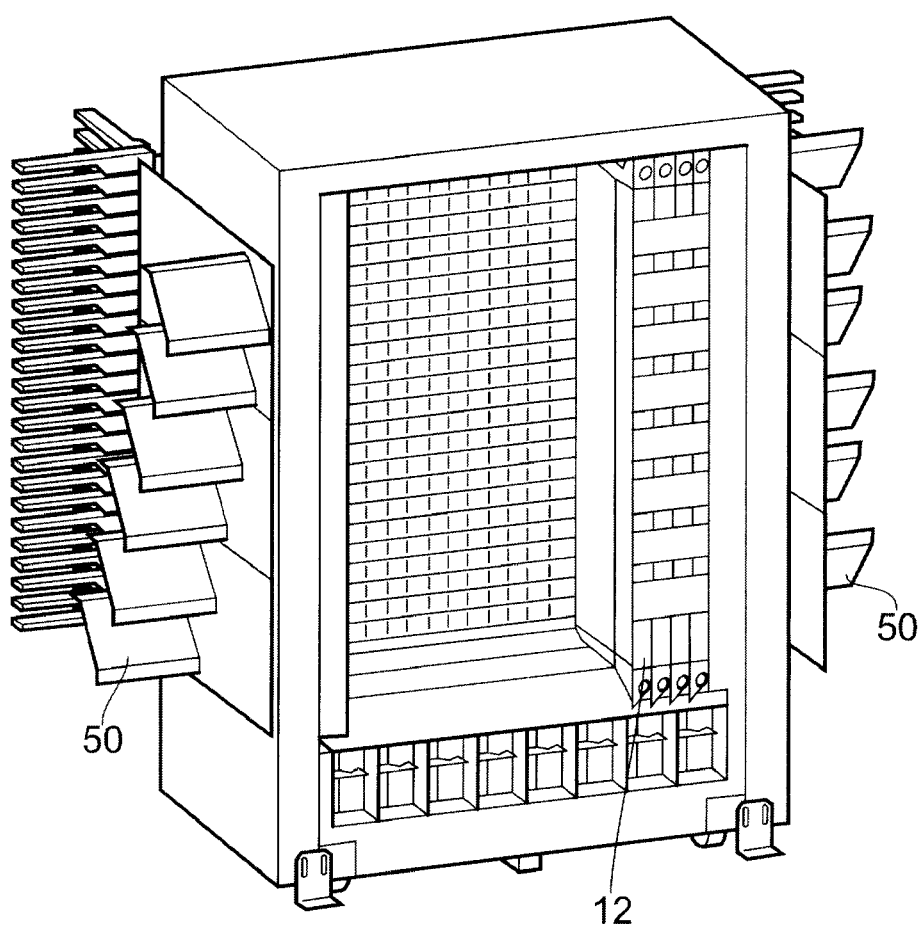

FIG. 5 is a front view of the switch chassis 10 showing cable management structures 50. FIG. 6 is a rear view of the switch chassis 10 showing the fabric cards 12, the power supply units 16 and cable management structures 50. FIG. 7 is a side view of the switch chassis 10 further showing the cable management structures 50. FIG. 8 is a top view of the switch chassis 10 further showing the cable management structures 50. FIG. 9 is an isometric view of the switch chassis 10 from the line card 14 (front) side further showing the cable management structures 50. FIG. 10 is an isometric view of the switch chassis 10 from the line card 14 (front) side showing four line cards 12 installed horizontally in the chassis 10 and part of the cable management structures 50. FIG. 11 is an isometric view of the switch chassis 10 from the fabric card 12

(rear) side showing four fabric cards 12 installed vertically in the chassis 10 and part of the cable management structures 50.

Figure 12:
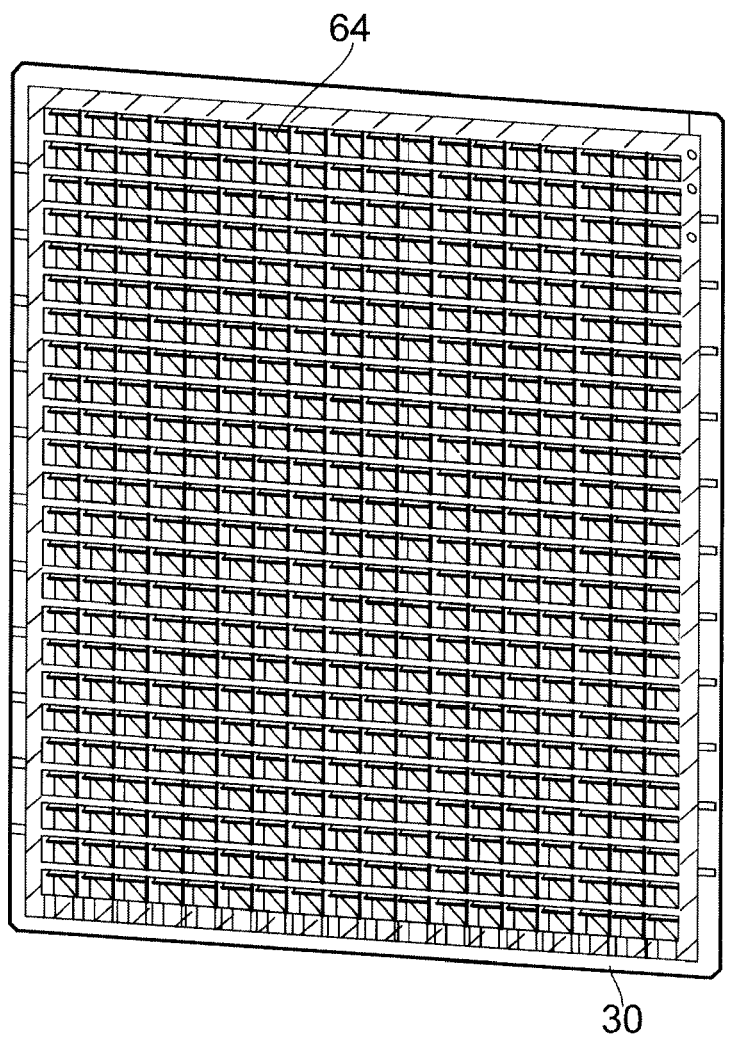
FIG. 12 is a first isometric view of an example of a midplane.
Figure 13:
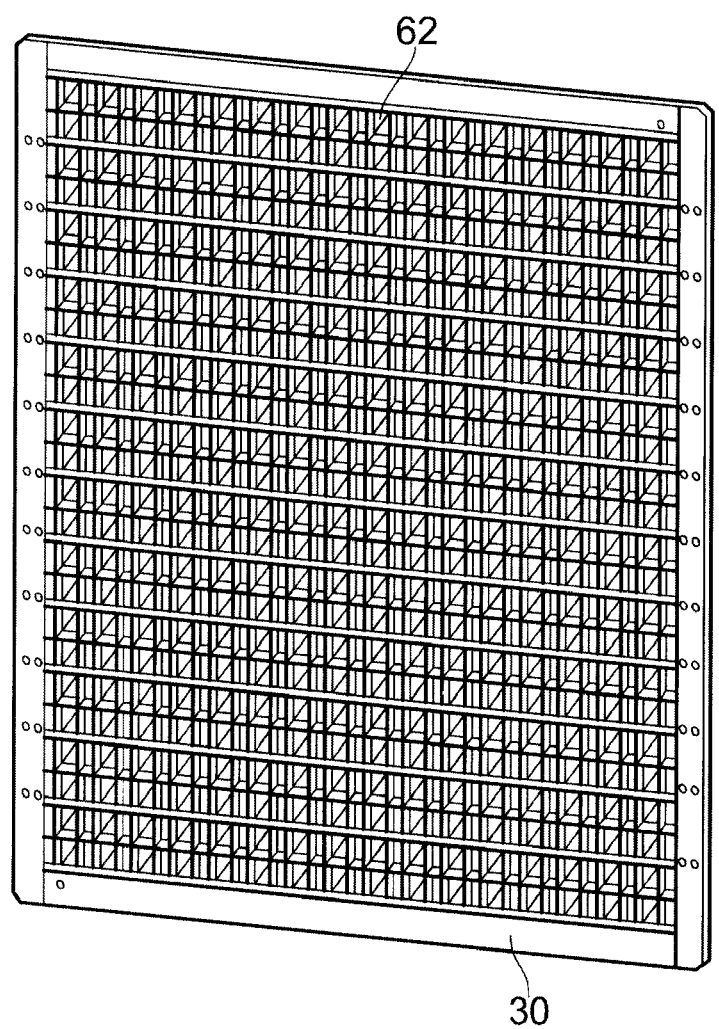
FIG. 13 is a further isometric view of an example of a midplane.

FIGS. 12 and 13 provide various schematic views of an example of a midplane 30 in accordance with the invention. FIG. 12 is an isometric view of the midplane 30 from the line card 14 (front) side and FIG. 13 is an isometric view of the midplane 30 from the fabric card 12 (rear) side. FIG. 12 shows the array formed from rows and columns of the second connectors 64 of the midplane connectors pairs 32 described with reference to FIG. 3. FIG. 13 shows the array formed from rows and columns of the first connectors 62 of the midplane connectors pairs 32 described with reference to FIG. 3.

Figure 14:
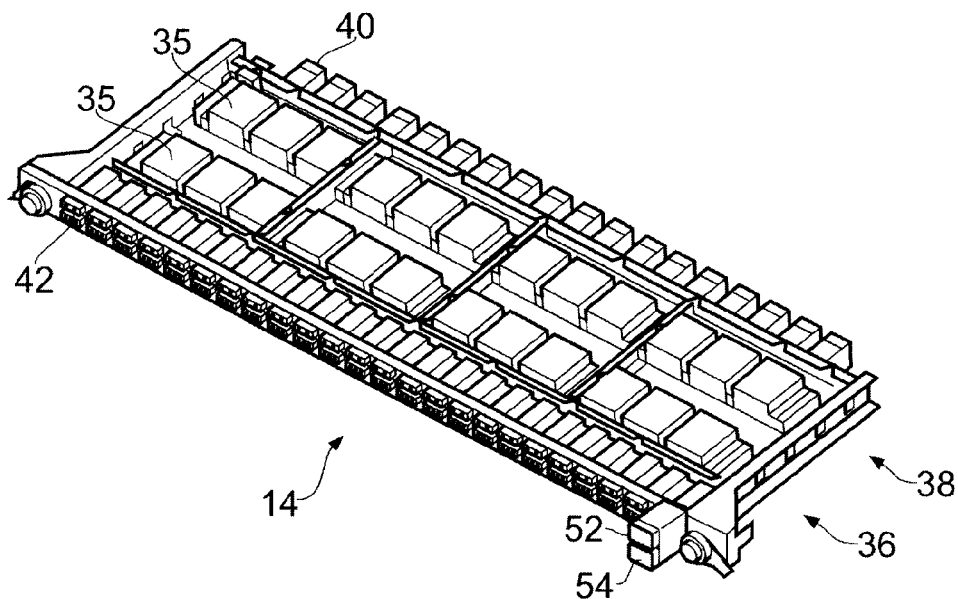
FIG. 14 is an isometric view of an example of a line card.

FIG. 14 is an isometric view of an example of a line card 14. This shows the first and second rows 36 and 38 of switch chips 35, the line board connectors 40 and the cable connectors 42. As can be seen in FIG. 14, the cable connectors 42 are stacked double connectors such each cable connector can connect to two cables 52 and 54.

Figure 15:
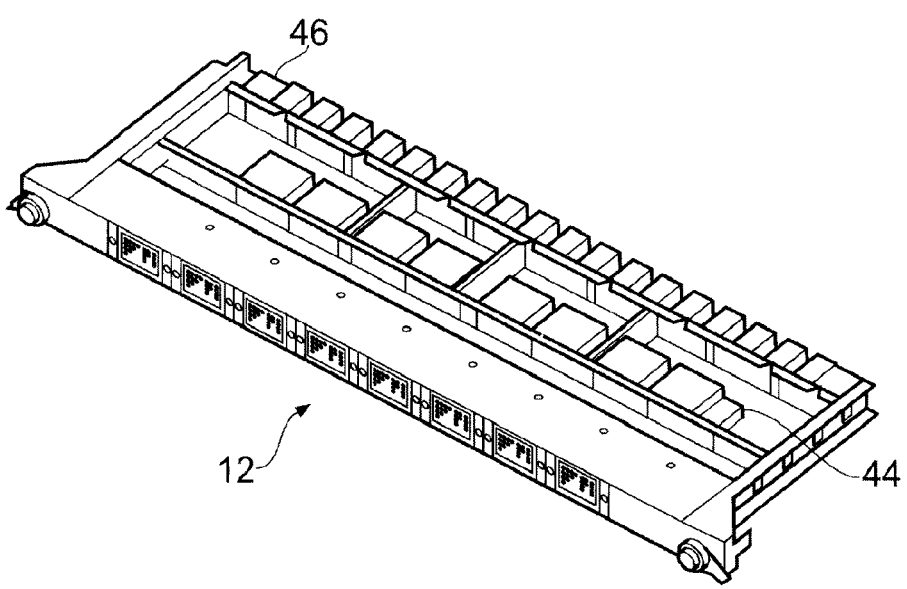
FIG. 15 is an isometric view of an example of a fabric card.

FIG. 15 is an isometric view of an example of a fabric card 12. This shows the fabric card connectors 46 and the switch elements 44.

Figure 16:
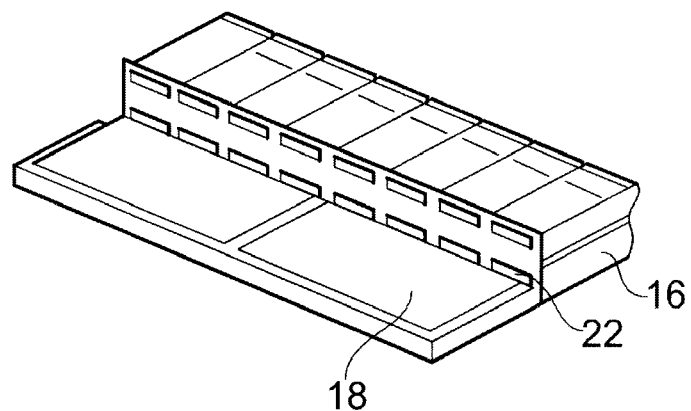
FIG. 16 is schematic representations of part of a switch chassis.
Figure 17:
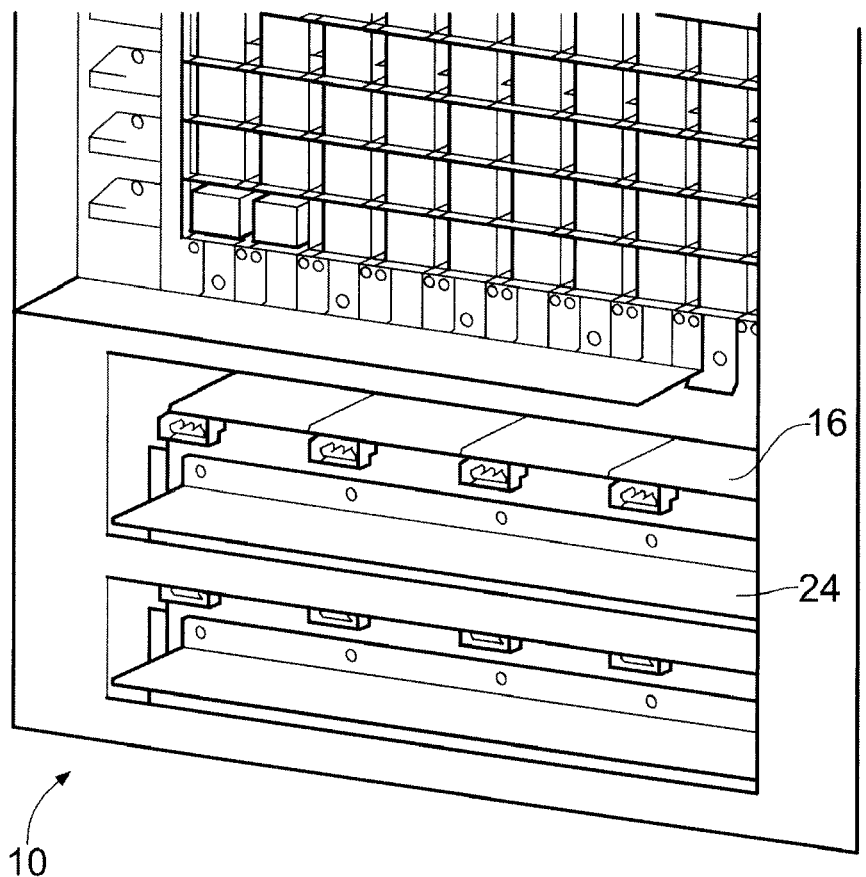
FIG. 17 is a further schematic representation of part of a switch chassis.

FIG. 16 is a schematic representation of an example of two chassis management controllers 18 plugged into one side of a power distribution board 22 and 16 power supply units 16 plugged into the other side of the power distribution board 22. In the present example, the chassis management controllers 18 are plugged into the front side of the power distribution board 22 and the power supply units 16 are plugged into the rear side of the power distribution board 22 as mounted in the switch chassis. FIG. 17 illustrates bus bars 24 for a 3.3V standby supply.

In the present example the midplane 30 is a passive printed circuit board that has dimensions of 1066.8 mm (42")×908.05 mm (35.75")×7.1 mm (0.280"). The active area is 40"×34". 864 8×8 midplane connectors (432 midplane connectors per side) are provided. There is a ribbon cable connection the power distribution board 22 and a 3.3V standby copper bar to the power distribution board 22.

In the present example a fabric card 12 comprises a printed circuit board with dimensions of 254 mm (10")×1016 mm (40")×4.5 mm (177"). It comprises 24 8×8 fabric card connectors 46, one power connector 39, 8 fan module connectors and 8 switch chips 44.

In the present example a line card 14 comprises a printed circuit board with dimensions of 317.5 mm (12.5")×965.2 mm (38")×4.5 mm (177"). It comprises 24 stacked cable 168-circuit connectors 42, 18 8×8 card connectors 40, 1 busbar connector and 24 switch chips 35.

In the present example a power distribution board 22 comprises a printed circuit board, 16 power supply DC connectors, 14 6×6 card connectors (7 connectors per chassis management card 18, ribbon cable connectors for low-speed connectivity to the midplane 30, and a 3.3V standby copper bar to the midplane 30.

In the present example a chassis management card 18 comprises 14 6×6 card connectors (7 connectors per chassis management card), two RJ45 connectors for Ethernet available on a chassis management card panel, two RJ45 connectors for serial available at the chassis management card panel, three RJ45 for line card/fabric card debug console access at the chassis management card panel, three HEX rotary switches used to select between which line card/fabric card debug console is connected to the three RJ45s above, and a 220-pin connector for the mezzanine.

In the present example a mezzanine has dimensions: 92.0 mm×50.8 mm and comprises 4 mounting holes for screws with either 5 mm or 8 mm standoff from the chassis management card board, a 220-pin connector for connectivity to chassis management board.

Figure 18:
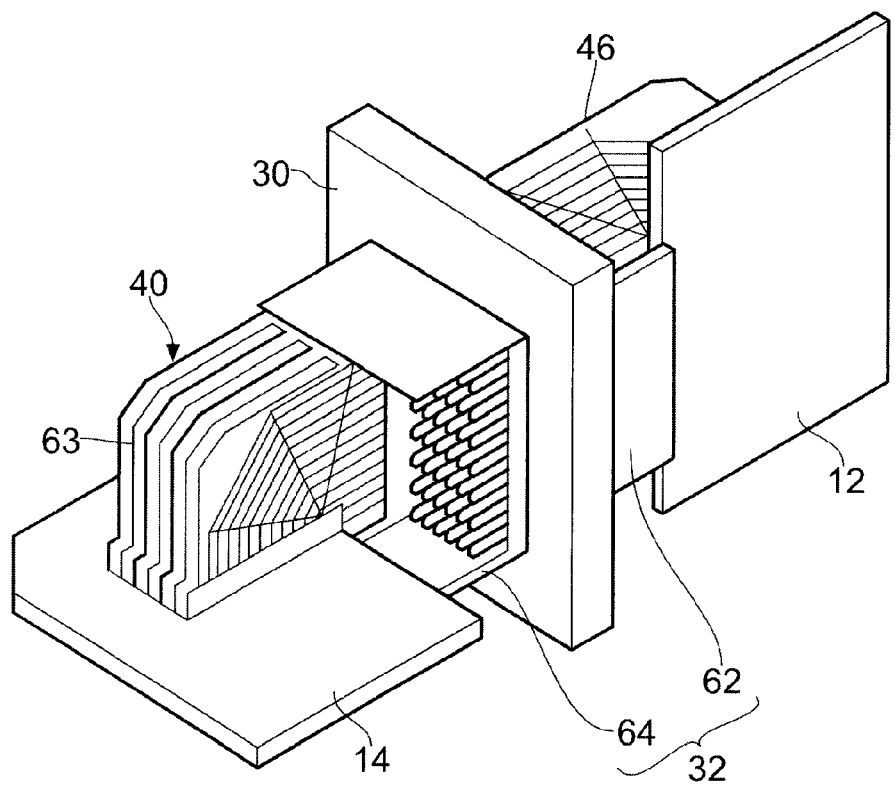
FIG. 18 is a schematic representation of the connections of two cards orthogonally with respect to each other.

FIG. 18 is a schematic isometric view of an example of a midplane connector pair 32. As can be seen in FIG. 18, the connector comprises a first, fabric side, connector 62 and a second, line card side, connector 64. In this example, each of the connector 62 and 64 is substantially U-shaped and comprises an 8×8 array of contact pins.

It will be noted that the second connector 64 of the midplane connector pair 32 is rotated through substantially 90 degrees with respect to the first connector 62. The first connector 62 is configured to connect to a corresponding fabric card connector 46 of a fabric card 12. The second connector 62 is configured to connect to a corresponding fabric card connector 46 of a line card 14. Through the orientation of the second connector 64 of the midplane connector pair 32 substantially orthogonally to the orientation of the first connector 62, it can be seen that the line card 14 is mounted substantially orthogonally to the fabric card 12. In the present example the line card 14 is mounted substantially horizontally and the fabric card is mounted substantially vertically 12.

Each of the contact pins on the connector 62 is electrically connectable to a corresponding contact of the fabric card connector 46. Each of the contact pins on the connector 64 is electrically connectable to a corresponding contact of the line card connector 40. The connector pins of the respective connectors 62 and 64 are connected by means of pass-through vias in the midplane 30 as will now be described in more detail.

Figure 19:
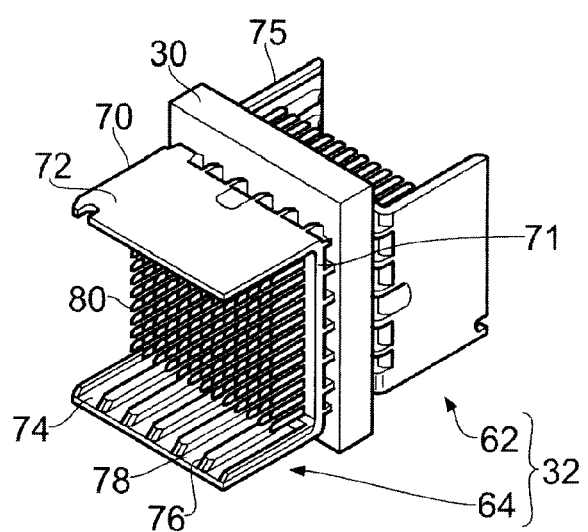
FIG. 19 is a schematic representation of an example of orthogonally arranged connectors.

FIG. 19 illustrates an example of the configuration of a first midplane connector 62 and a second midplane connector 64 of a midplane connector pair 32 in more detail. In the example shown in FIG. 19 that second connector 64 (the line card side connector) comprises a substantially U-shaped frame 70 including a substantially planar base 71 and first and second substantially planar walls 72 and 74 that extend at substantially at 90 degrees from the base 71. The inside edges of the first and second substantially planar sides 72 and 74 are provided with ridges 76 and grooves 78 that provide guides for the line card connector 40.

As can be seen in FIG. 18, the line card connector 40 has a structure that comprises a plurality of contact planes 63 that are aligned side by side, such that it has a generally planar construction that extends up from the line card 14. Line card connector planes comprise printed circuit boards carrying traces leading to contacts. The traces and contacts can be provided on both sides of the printed circuit boards of the line card connector planes.

By comparing FIGS. 18 and 19, it can be seen that each contact plane 63 of the line card connector 40 can be entered into a respective one of the grooves 78 so that connectors of the line card connector 40 can then engage with contact pins 80 of the second connector 64. In the case of the line card side connector portion 64, the orientation of second connector 64 and the grooves 78 therein means that the line card 12 is supported in a substantially horizontal orientation. In the example shown in FIG. 19, an 8×8 array of connector pins 80 is provided.

The first midplane connector 62 (fabric card side connector) of the midplane connector pair 32 has substantially the same form as the second midplane connector 62 of the midplane connector pair 32, except that it is oriented at substantially 90 degrees to the second midplane connector 64. In this example the second midplane connector 62 comprises a substantially U-shaped support frame 75 including a substantially planar base and first and second substantially walls and that extend at substantially at 90 degrees from the base. The inside edges of the first and second substantially planar sides are provided with ridges and grooves that provide guides for the fabric card connector 46. The fabric card connector 46 has the same basic structure as that of the line card connector 40 in the present instance. Thus, in the same way as for the line card connector, each of a plurality of contact planes of the fabric card connector 46 can be entered into a respective one of the grooves so that connectors of the fabric card connector 46 can then engage with contact pins of the first connector 62. The orientation of the first connector 62 and the grooves therein means that the fabric card 12 is supported in a substantially vertical orientation.

In the example illustrated in FIG. 19, the orthogonal connector 60 provides an 8×8 array of connector pins 80 is provided that can support supports 64 differential pairs or 32 bi-directional serial channels (two wires per direction) in a footprint of 32.2×32.2 mm.

As mentioned above, the contact pins of the first and second midplane connectors 62 and 64 of a midplane connector pair 32 are connected by means of pass through vias in the midplane.

Figure 20:
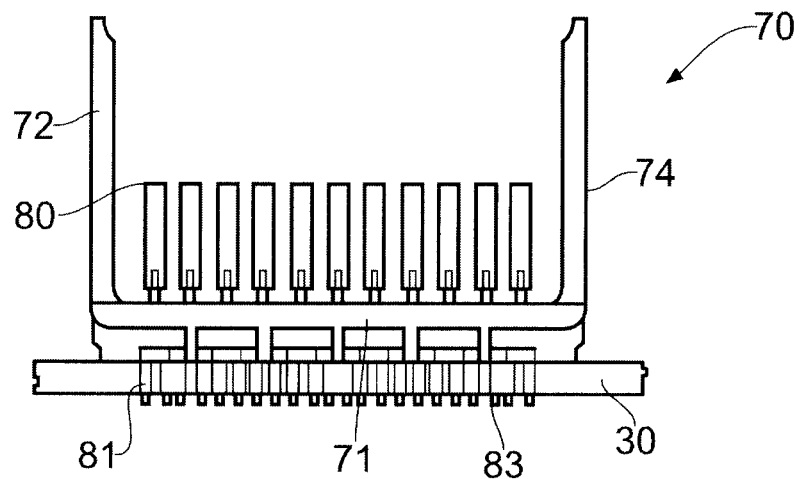
FIG. 20 is a schematic side view of one of the connectors of FIG. 19.

FIG. 20 illustrates a side view of an example of a midplane connector, for example the midplane connector 62 mounted on the midplane. In the example shown in FIG. 20 the midplane connector 64 comprises a substantially U-shaped frame 70 including a substantially planar base 71 and first and second substantially planar walls 72 and 74 that extend at substantially at 90 degrees from the base 71. The contact pins 80 are each connected to pairs of contact tails 81 that are arranged in sprung pairs that are arranged to be push fitted into pass through vias 83 in the midplane 30.

In use, the other midplane connector (e.g., the first midplane 62) of the midplane connector pair would be inserted into the pass through vias in the other side of the midplane 30 in the orthogonal orientation as discussed previously.

Figure 21:
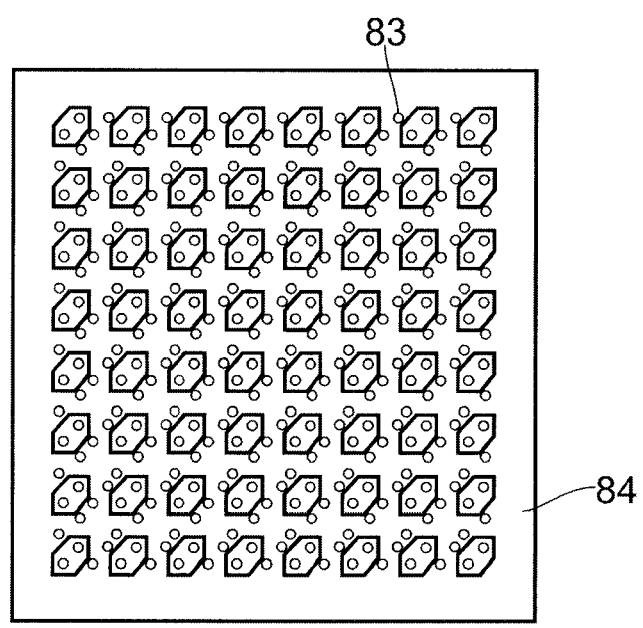
FIG. 21 is a plan view of an example configuration of vias for the orthogonal connector pairing of FIG. 19.
Figure 22:
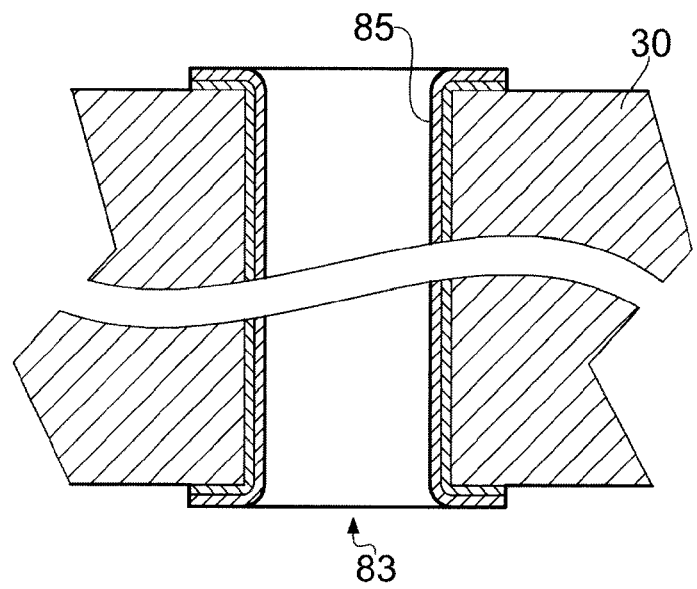
FIG. 22 is a cross-section through of a via.

FIG. 21 is a schematic representation of an area of the midplane for receiving the midplane connectors 62 and 64 of the midplane connector pair 32. This shows the array of vias 83. FIG. 22 is a schematic cross-section though such a via 83 in the showing the conductive wall 85 of the via 83. The conductive wall 85 can be formed by metal plating the wall of the via, for example.

Figure 23:
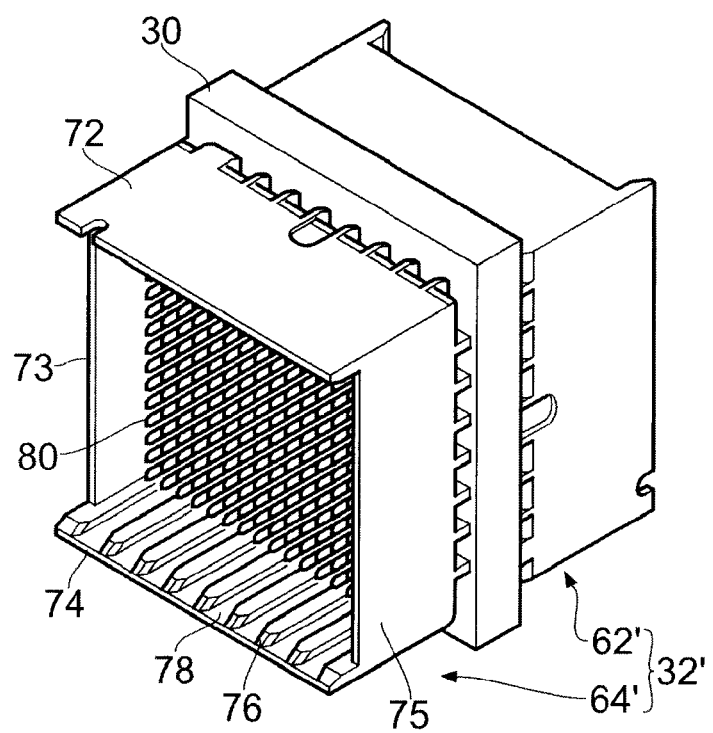
FIG. 23 is a schematic side view of example of an alternative to the connector of FIG. 20.

The examples of the midplane connectors described with reference to FIGS. 18 and 20 had a generally U-shape. However, other configurations for the midplane connectors are possible. For example FIG. 23 illustrates another example of a midplane connector pair 32', where the first and second midplane connectors 62' and 64' are generally the same as the first and second midplane connectors 62 and 64 described with reference to FIG. 19 except that, in addition to the first and second walls 72 and 74, third and fourth walls 73 and 75 are provided. The additional walls provide a generally box-shaped configuration that can facilitate the insertion and support for the cards to be connected thereto.

It will be appreciated that in other examples the first and second midplane connectors could have different shapes and/or configurations appropriate for the connections for the cards to be connected thereto.

The array of midplane connector pairs 32 as described above provides outstanding performance in excess of 10 Gbps over a conventional FR4 midplane because the orthogonal connector arrangements allow signals to pass directly from the line card to the fabric card without requiring any signal traces on the midplane itself. The orthogonal arrangements of the cards that can result from the use of the array of orthogonally arranged connector pairs also avoids the problem of needing to route a large number of signals on the midplane to interconnect line and fabric cards, minimizing the number of layers required. This provides a major simplification compared to existing fabric switches. Thus, by providing an array of such orthogonal connectors, each of a set of horizontally arranged line cards 14 can be connected to each of a set of vertically aligned fabric cards 12 without needing intermediate wiring.

Figure 24:
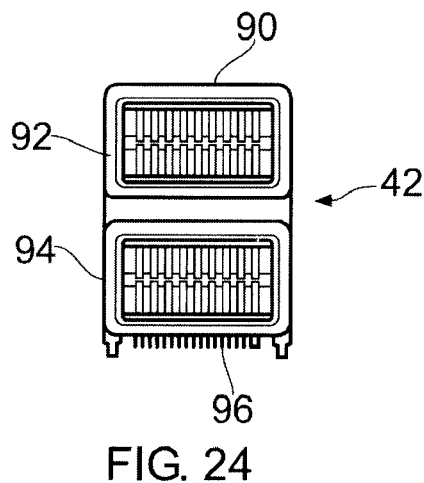
FIG. 24 is a schematic end view of an example cable connector.
Figure 25:
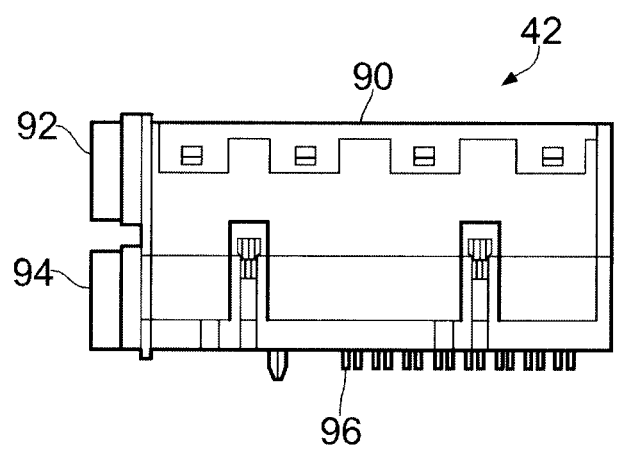
FIG. 25 is a schematic side view of the example cable connector.
Figure 26:
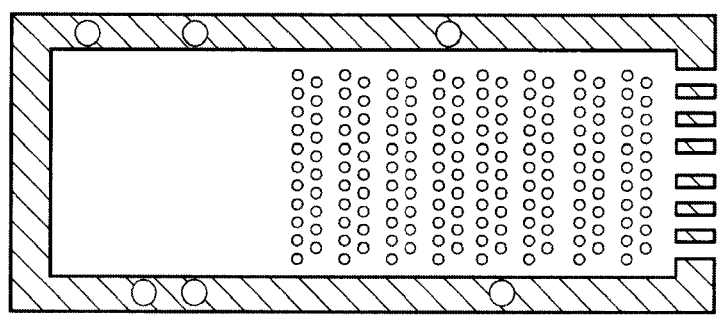
FIG. 26 represents a footprint of the cable connector.

FIGS. 24 and 25 provide an end view and a side view, respectively, of an example of a cable connector 42 as mentioned with reference to FIGS. 3 and 14. As shown in FIG. 24 and 25, the cable connectors 24 and 25 include first and second cable connections 92 and 94 stacked within a single housing 90. This provides for a very compact design. Board contacts 96 are provided for connecting the connector to a line card 14. FIG. 26 is a plan view of the connector footprint for the board contacts 96 of the cable connector 42. The stacked arrangement facilitates the providing of line cards that are high density line cards supporting a 12X cable providing 24 line pairs with 3 4X links aggregated into a single cable. The cable connectors provide 12X cable connectors that are smaller than a conventional 4X connector, 3X denser than a standard InfiniBand 4X connector and electrically and mechanically superior. Using 12X cable (24 pairs) can be almost 50% more area efficient than three 4X cables and requires three times fewer cables to install and manage.

Figure 28:
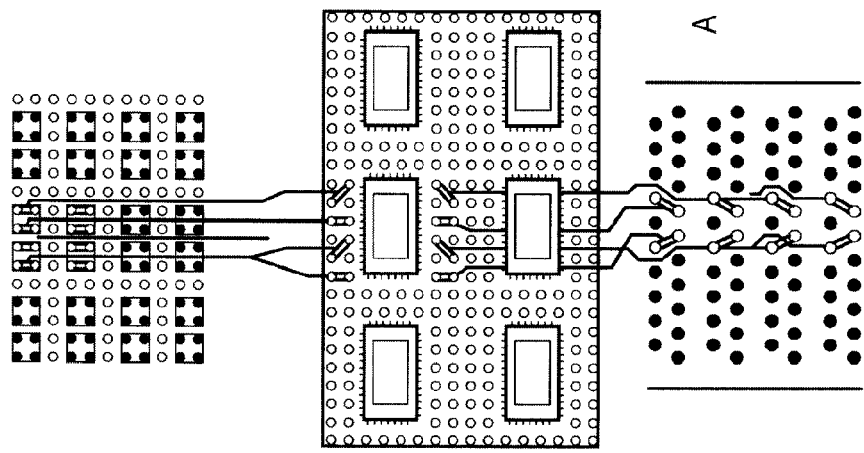
FIGS. 27 and 28 illustrates example of signal routing for a cable connector.
Figure 27:
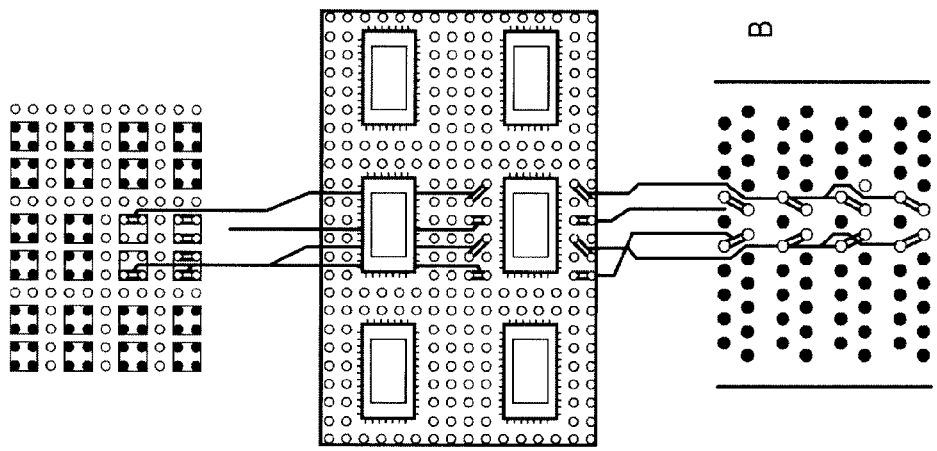

FIGS. 27 and 28 illustrate an example of the routing of signals from each of two 12x port sections 92 and 94 of a cable connector 42 to the equalizers and to a switch chip on a line card 14. FIG. 27 shown an example of routing from a first 12x port section. FIG. 28 shows an example of the routing from a second 12x port section. The transmit (Tx) lines are equalized, and can be connected directly from the switch chip to the cable connector. The signals can be routed on lower layers in order to minimize via stub effects.

Figure 29:
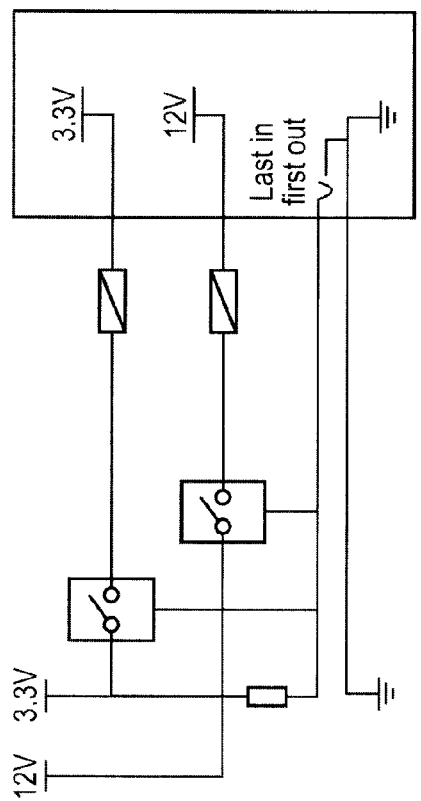
FIG. 29 illustrates an example of a power supply for the cable connector.
Figure 30:
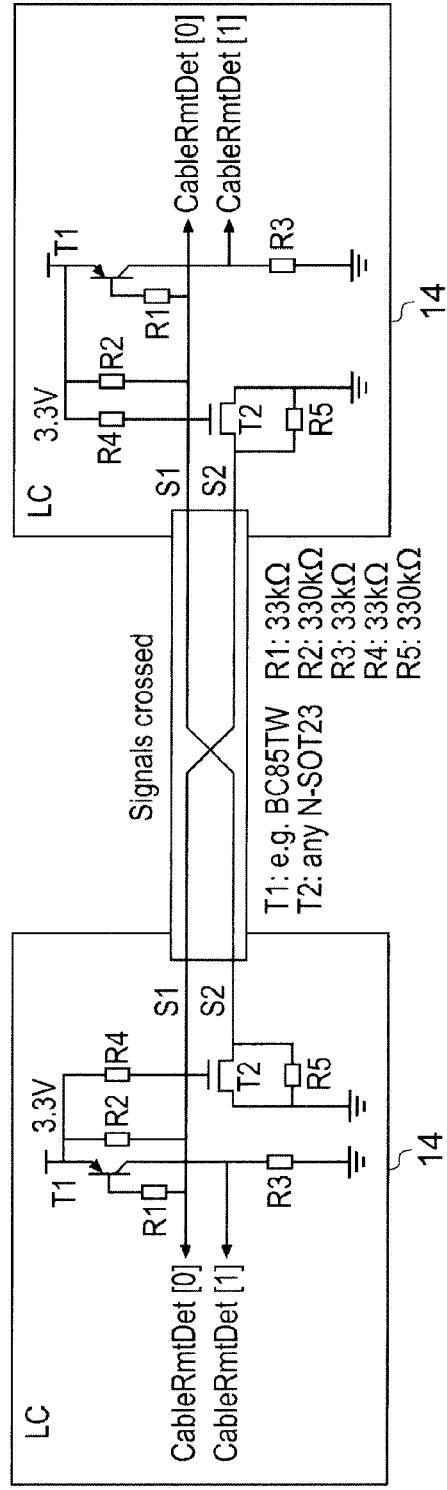
FIG. 30 illustrates an example of cable status sense detection circuitry.
Figure 31:
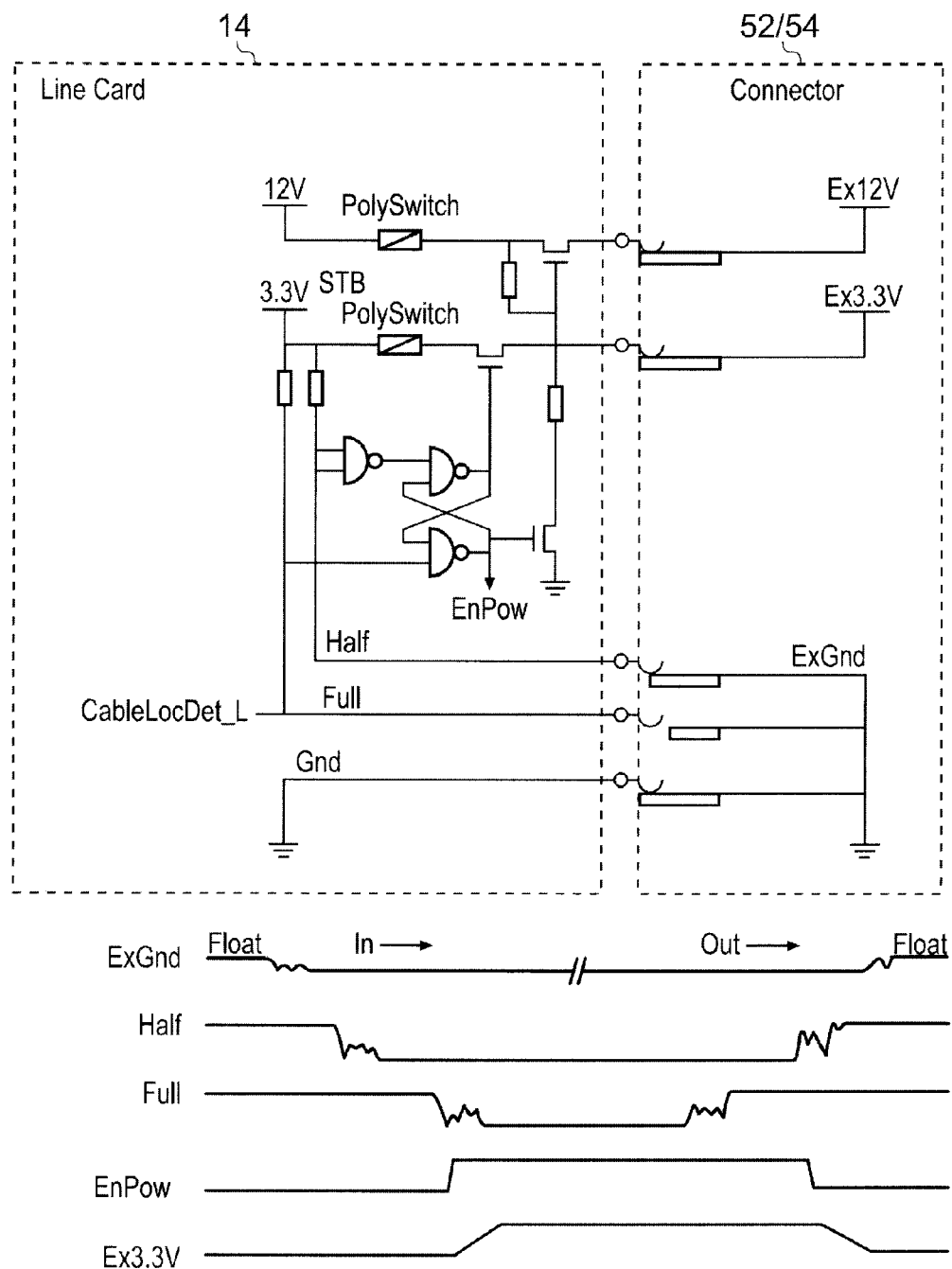
FIG. 31 illustrates an example of hot plug control circuitry.

FIG. 29 illustrates an example of a power supply for the cable connector and FIG. 30 illustrates an example of a cable status sense detection circuitry. The cable sense detection circuitry is operable to test from each end whether the other end is plugged or not, and, if plugged, to see if power from the power supply is on. Provisions are made such that "leaking" power from a powered to un-powered end is avoided. A valid status assumes that an active end is plugged. FIG. 31 is a schematic diagram of an example of a hot plug control circuit that enables hot plugging of cables. The switch chassis can thereby provide active cable support for providing active signal restoration at a cable connector. Active cable support can provides benefits of increased distances for copper cables as a result of active signal restoration at the connector, increased maximum cable distance by over 50%, using thinner and more flexible cables (e.g., reducing a cable diameter by up to 30%, which facilitates good cable management. A cable to connector interface can provide one, more or all of local and remote cable insertion detection, cable length indication, remote node power-on detection, remote power, a serial number and a management interface.

Figure 32:
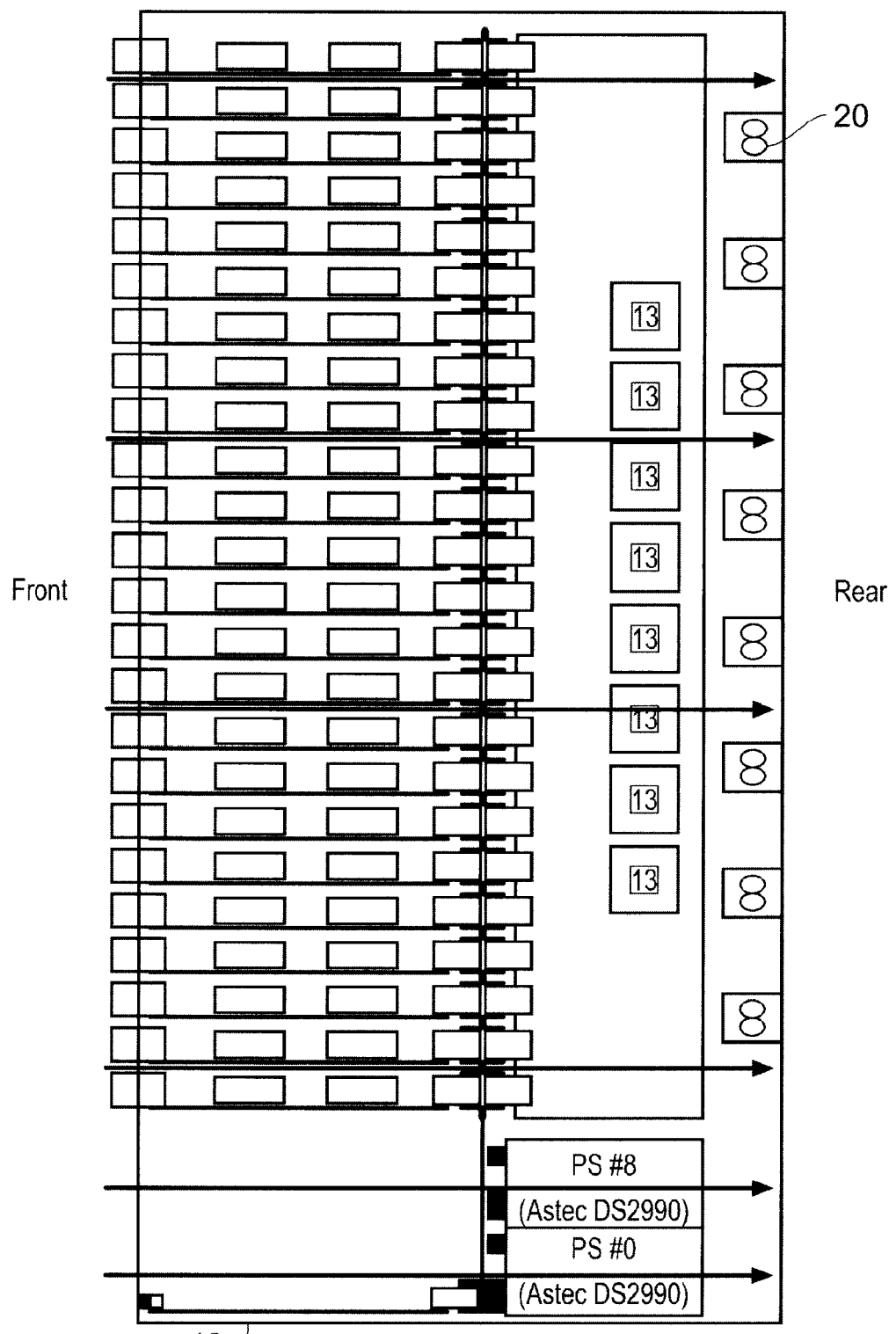
FIG. 32 is a schematic representation of airflow though a switch chassis.

FIG. 32 is a schematic representation of the airflow through an example switch chassis. As illustrated by the arrows, the airflow is from the front to the rear, being drawn through by fans 20 in the fabric cards 12 and the power supplies 18.

The air inlet is via perforations at the line card 14 front panel. Fans 20 at the fabric cards 12 pull air across the line cards, though the openings 34 in the vertical midplane 30 and across the fabric cards 12.

Line card cooling is naturally redundant since the fabric cards are orientate orthogonally to the line cards. In other words, cooling air over each line card is as a result of the contribution of the effect of the fans of the fabric cards along the line card due to the respective orthogonal alignment. In the case that a fabric card fails or is removed, a portion of the cooling capacity is lost. However, as the cooling is naturally redundant the line cards will continue to operated and be cooled by the remaining fabric cards. Each fan is internally redundant and the fans on the fabric cards 12 can be individually hot swappable without removing the fabric card 12 itself. The fabric card 12 and line card 14 slots can be provided with blockers to inhibit reverse airflow when a card is removed. Empty line card 14 and fabric card 12 slots can be loaded with filler panels that prevent air bypass.

Each power supply has an internal fan that provides cooling for each power supply. Fans at the power supplies pull air through chassis perforations at the rear, across the chassis management cards 18, and through the power supply units 16. Chassis management card cooling is naturally redundant as multiple power supply units cool a single the chassis management card.

It will be appreciated that changes and modifications to the above described examples are possible. For example, although in the present example cooling is provided by drawing air from the front to the rear, in another example cooling could be from the rear to the front.

Also, although in the above described examples the fabric cards and the switch cards are described as being orthogonal to each other, they do not need to be exactly orthogonal to each other. Indeed, in an alternative example they could be angled with respect to each other but need not be exactly orthogonal to each other.

Also, in the above described examples the midplane connector pairs 32 are configured as first and second connectors 62 and 64, in another example they could be configured as a single connector that is assembled in the midplane. For example, through connectors could be provided that extend through the midplane vias. The through connectors could be manufactured to be integral with a first connector frame (e.g., a U-shaped frame or a box-shaped frame as in FIGS. 19 and 23, respectively) and the contacts inserted through the vias from a first side f the midplane 30. Then a second connector frame could be inserted over the connectors on the second side of the midplane 30 in a mutually orthogonal orientation to the first connector frame.

An example cable-based switch chassis can provide a very large switch having, for example, one or more of the following advantages, namely a 3456 ports non-blocking Clos (or Fat Tree) fabric, a 110 Terabit/sec bandwidth, major improvements in reliability, a 6:1 reduction in interconnect cables versus leaf and core switches, a new connector with superior mechanical design, major improvement in manageability, a single centralized switch with known topology that provides a 300:1 reduction in entities that need to be managed.

The above described system provides an example of a cluster system.

As mentioned in the introduction, cluster systems comprising stand-alone server nodes have typically verified node-node connectivity based on being able to reach identified peer nodes via the data network (cluster interconnect fabric). As long as the list of (potential) member nodes is part of persistent cluster configuration information, this checking can take place initially at cluster definition time, and then be part of the normal run-time monitoring of the overall state of the cluster and the individual member nodes. If communication is not possible for some node combination(s), then this will typically be reported, and an operator will have to verify both correct connectivity as well as the state of both nodes and interconnect components. At cluster definition (construction) time, this will typically be part of a procedure for verifying correct wiring and configuration.

The cluster interconnect structure can be complex both in terms of number of cables and connectors as well as in terms of the number of individual nodes, adapters and switches. For example, configurations can vary from simple two-node clusters to complex topologies with thousands of end-nodes. Also, it may be necessary to perform a significant number of operations on a large number of individual components to determine state and/or verify connectivity. Hence, for any such cluster interconnect system, simplified and automated verification of correct connectivity and associated trouble shooting is desirable in order to maximize availability and minimize maintenance costs. This applies when a physical configuration is constructed initially, when dynamic connectivity changes takes place due to component faults or operator generated errors, as well as when a configuration is being expanded or upgraded.

The ability to communicate between any relevant pairs of nodes does not inherently imply that the correct connectivity in terms of optimal topologies and path independence has been achieved. Hence, more sophisticated verification of the interconnect structure is required in order to make sure that the cluster is configured (physically and logically) according to rules of "best practice" for the relevant set of nodes. In addition, new techniques for logical partitioning and virtualization at both the physical server node level as well as within the interconnect fabric significantly adds to the complexity associated with constructing and maintaining cluster configurations. Among other things, this imposes a need to distinguish between physical ("mechanical") connectivity in terms of cables and connectors between switches and (physical) cluster nodes and the logical connectivity in terms of which hosts (logical nodes) are able to communicate.

Accordingly, an embodiment of the present invention is arranged to provide both in-band and out-of-band based management. In this, use is made of dedicated management network(s) (logical or physical) to which servers and other data center equipment (e.g., switches and routers for both the generic data network(s) as well as for the dedicated cluster fabrics/networks) are connected. As a result, nodes and switches for a cluster configuration can communicate using out-of-band traffic on the management network as well as in-band traffic on the data network (cluster fabric).

Advanced interconnect fabric technologies such as InfiniBand have been designed to allow in-band management traffic, and do thereby not depend on out-of-band connectivity for becoming operational. However, due to the associated simplicity and low cost, also InfiniBand switch- and IO-enclosures will typically include one or more basic Ethernet ports for simple and direct connectivity to the management network. This kind of connectivity typically also has the benefit of not depending on any other internal InfiniBand device to be operational, hence it represents enhanced RAS relative to a component that depends on being able to perform all management operations (including event and error reporting) in-band via the IB fabric. Also, due to very low power requirements for typical Service Processors and associated NICs, such out-of-band access can normally be provided also when the system is operating in only stand-by (auxiliary) power mode.

Figure 33:
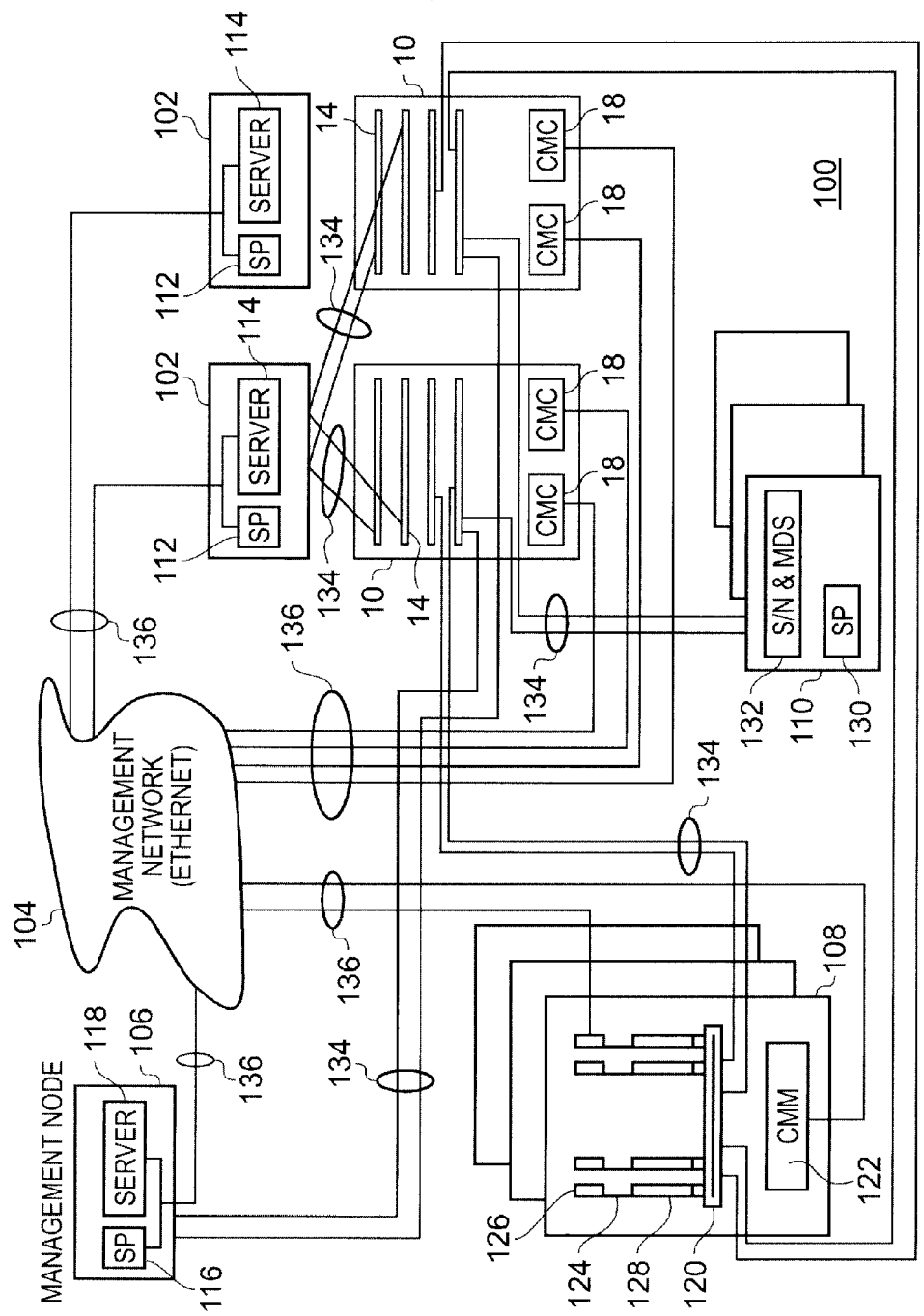
FIG. 33 is a schematic representation of an example cluster configuration.
Figure 34:
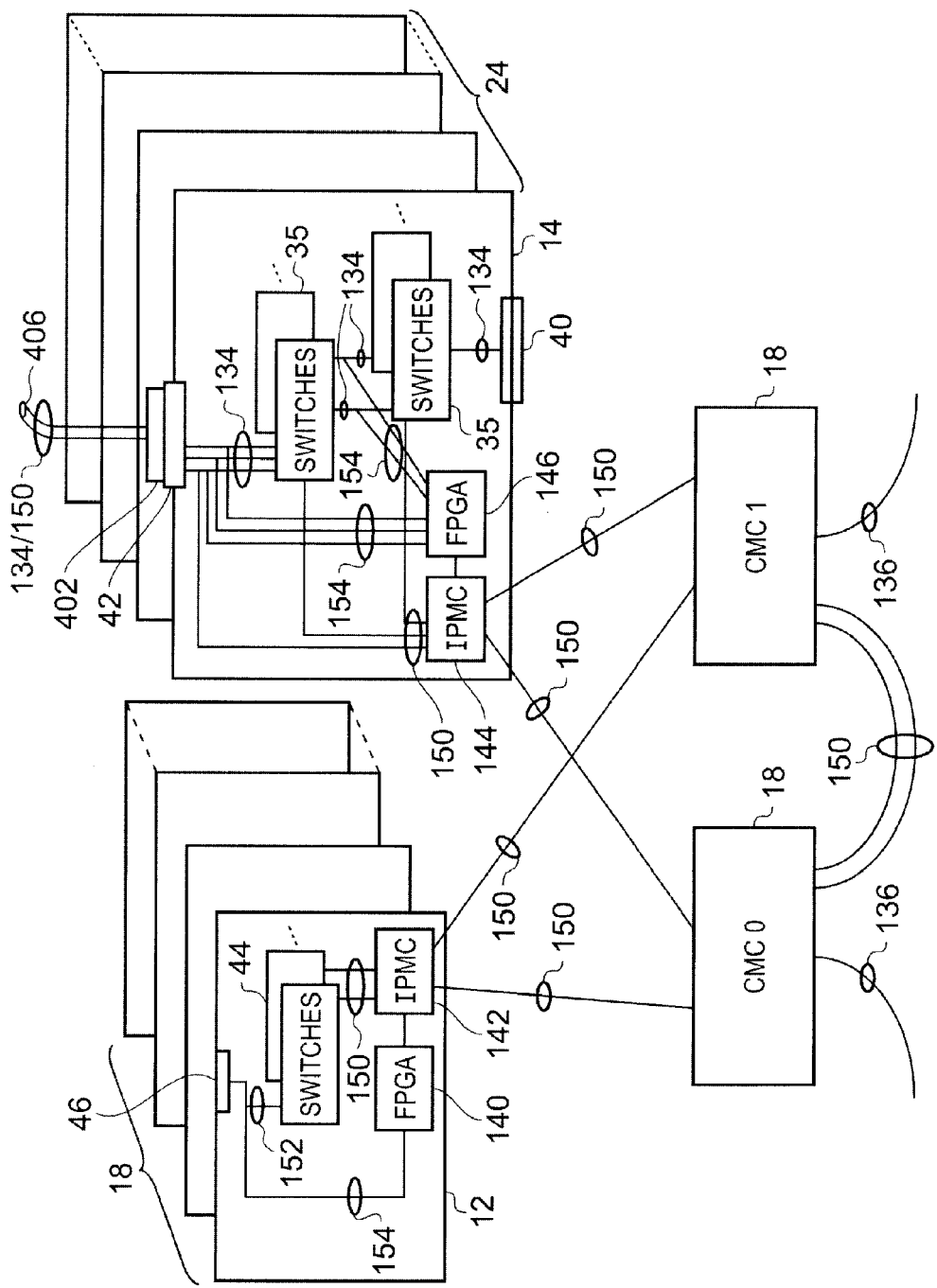
FIG. 34 is a schematic representation of part of the cluster configuration of FIG. 33.
Figure 35:
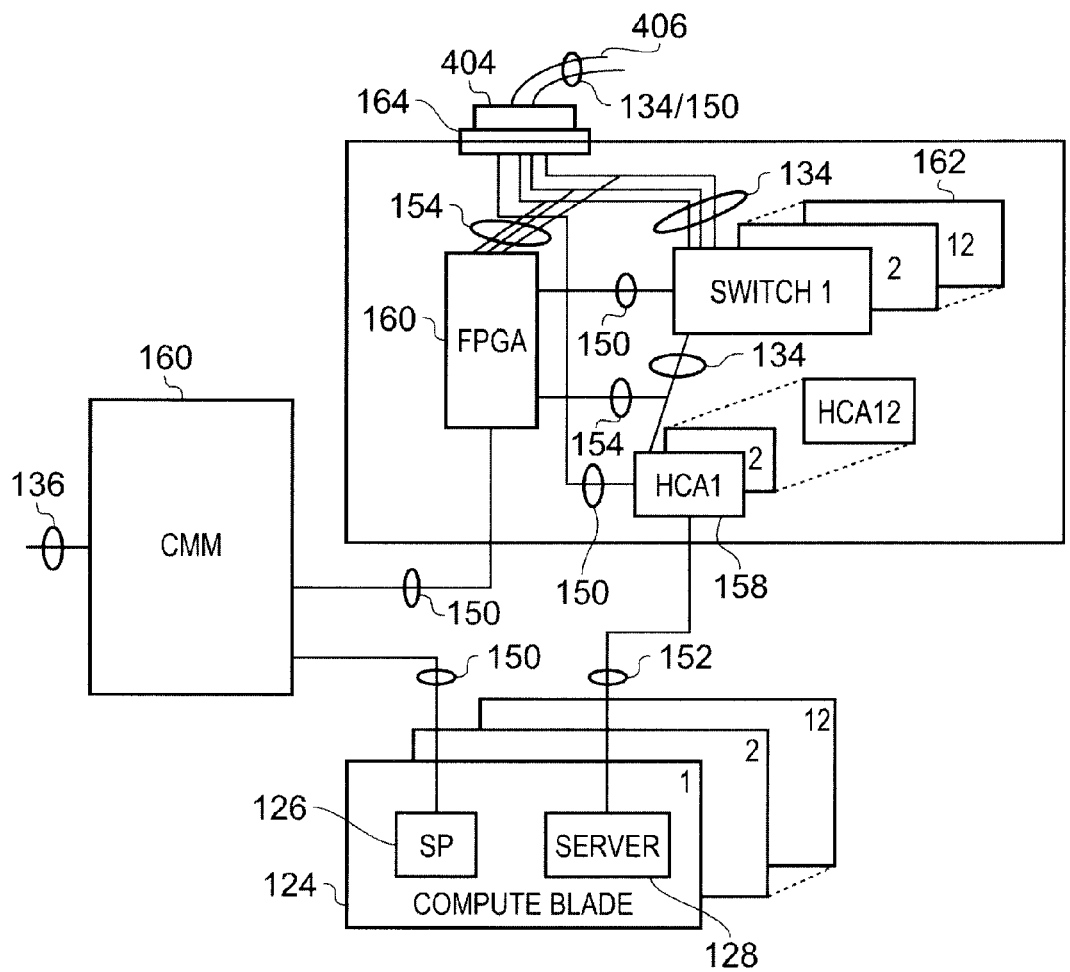
FIG. 35 is a further schematic representation of part of the cluster configuration of FIG. 33.

FIGS. 33 to 35 illustrate a schematic representation of an example implementation of a cluster system in which two switch systems 10 as described above are arranged in a parallel configuration. Various interconnection types are represented in FIGS. 33-35. In the example implementation of FIGS. 33-35, the interconnections include InfiniBand data interconnections 134, Ethernet management network interconnections 136, I2C links 150, PCI-E (Peripheral Component Interconnect-Express) links 152 and status signals for links and cables 154.

In the example configuration shown in FIG. 33, two switch management server systems 102 are arranged in a redundant configuration with respect to the switches 10. Each of the switch management server systems 102 includes a service processor 112 and a management server 114. The management servers 114 implements subnet management logic, fabric director logic and switch and fabric visualization tools. The switch management server systems 102 are directly connected to each of the switches via InfiniBand connections 134 and are also connected to the CMCs 18 of the switches 10 via an Ethernet management network 104/136.

One or more management node systems 106 are also provided that each include a service processor 116 and a server 118. The management node systems 106 provide OS and firmware provisioning, various other system and hardware monitoring and management, workload provisioning and scheduling as well as user log-in to the cluster. Each of the management node systems 106 is directly connected to each of the switches 10 via InfiniBand connections 134 and is also connected to the CMCs 18 of the switches 10 via the Ethernet management network 104/136.

One or more storage node and metadata systems 110 are also provided that each includes a service processor 130 and a server 132. Each of the storage node and metadata systems 110 is directly connected to each of the switches 10 via InfiniBand connections 134 and is also connected to the CMCs 18 of the switches 10 via the Ethernet management network 104/136.

One or more blade systems 108 are also provided. Each blade system 108 includes one or more blades 124. Each of the blades includes a blade service processor 126 and a blade server 128. The blades are interconnected via an interconnect card (network element module) 120. The interconnect card 120 is further connected to each of the switch systems 10 via InfiniBand connections 134. The blade service processors are also connected the CMCs 18 of the switch systems 10 via a CMM 122 via the Ethernet management network 104/136. The blade service processors are further connected with the Ethernet management network 104/136.

FIG. 34 illustrates the interconnection of the fabric cards 12 and the line cards 14 of a switch system 10 with the CMCs.

In the example illustrated in FIG. 34, each of up to 18 fabric cards 12 includes a plurality of switch chips 44. Each of the switch chips 44 is connected to the fabric card connectors 46 via InfiniBand connections 152. An Intelligent Platform Management Interface Controller (IPMC) 142 manages an I2C redundant connection between the IPMC 142 and each of the CMCs 18. A field programmable gate array (FPGA) chip 140 is connected to the IMPC 142 and is connected to the status signal lines 154 for the InfiniBand connections to the fabric card connectors 46. The FPGA 140 can provide for local routing and/or storage of status signals from the status lines 154.

In the example illustrated in FIG. 34, each of up to 24 line cards 14 includes a plurality of switch chips 35. A first subset of the switch chips 35 on a line card 14 is connected to the line card connectors 40 via InfiniBand connections 134 and a second subset of the switch chips 35 on the line card 14 is connected to the line connector 42 for the line card 14. The first and second subsets of switch chips 35 are also interconnected via InfiniBand connections 134. An Intelligent Platform Management Interface Controller (IPMC) 144 manages an I2C redundant connection 150 between the IPMC 144 and each of the CMCs 18. An FPGA 146 is connected to the IMPC 144 and is connected to the status signal lines 154 for the InfiniBand connections 134 to the line connectors 42 of the line card 14, as well as the cable presence and status signals 154 of the line connectors 42 of the line card 14. The FPGA 146 can provide for local routing and/or storage of status signals from the status lines 154. The IPMC 144 also has I2C links 150 to each of the line connectors 42 that provide access to cable serial number and other information (type, length etc.) provided in FRU information storage in the cable connector(s) 404 of the cable(s) 406 that implement the InfiniBand connections 134 (see FIG. 36).

The CMCs 18 are interconnected via dedicated serial links in the form of a pair of links 150 shown between the CMCs 18. Each of the CMCs are connected to the Ethernet management network via Ethernet management network connections 136.

FIG. 35 illustrates interconnections between the interconnect card 120 in the chassis of the blade system 108 and the compute blades of the blade system 108.

In the example illustrated in FIG. 35, the interconnect card comprises a plurality of switch chips 162 providing routing of signals from the server blades to the InfiniBand connections from the blade system 108 to the switch systems 10 as illustrated in FIG. 33. An FPGA 160 is provided that can provide for local routing and/or storage of status signals from the status lines 154. A host channel adapter (HCA) 158 is provided for each of the server blades 124. Each HCA 158 is connected to a server 128 of a server blade 124 by a PCI-E connection. The switch chips 162 are connected to the HCAs 158 via InfiniBand connections. The FPGA chip 160 is connected to the status signal lines 154 for the InfiniBand connections to interconnect card line connectors 164, one of which is shown. The FPGA 160 is connected to the switch chips 44 and to the interconnect card line connectors 42 via I2C links 150. FIG. 35 also illustrates a cable connector 404 at the second end of the cable 406 (also illustrated in FIG. 34), connected to the interconnect card line connector 164.

Figure 36:
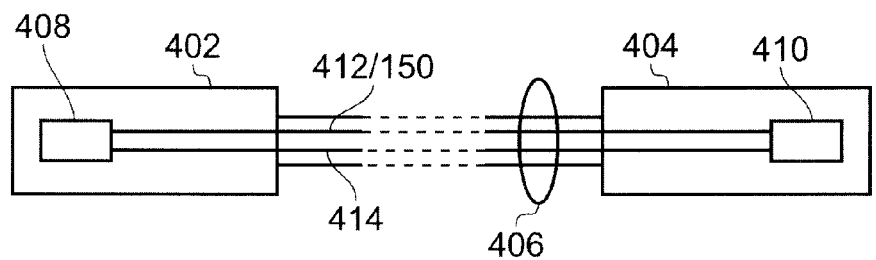
FIG. 36 is a schematic representation of a cable.

FIG. 36 is a schematic representation of a cable 406 comprising a first connector 402 at a first end point thereof and a second connector 404 at a second end point thereof. In addition to data signal conductors (not shown), which in the present example form an InfiniBand connection, the cable 406 includes a management signal line (e.g., an I2C line) 412 and a power signal line 414. The I2C management signal line 412 (150) and a power signal line 414 extend between connector logic and/or data storage 408 in the first connector 402 and connector logic and/or data storage 410 in the second connector 404. The connector logic can provide a logical interface to a chassis component connector when the cable connector is connected thereto, and the data storage can provide the FRU information storage mentioned above.

In such a cluster system as illustrated in FIGS. 33 to 35, use is made of the existence of both an out-of-band management network (e.g., access via for example via one or more of the Ethernet connections) and the in-band cluster interconnect (e.g., the InfiniBand fabric).

In a moderate sized cluster configuration, the cluster configuration can be specified as a list of nodes that are candidates for being members of the cluster. Which nodes are actually members at any point in time depends on operational status as well as administrative considerations. The list can identify IP addresses, host names etc., and represents basically a pure logical view of the cluster as a collection of hosts that are assumed to be able to communicate.

In order to deal with the physical construction of a cluster configuration, a physical ("mechanical") view is provided that identifies what physical components are involved, as well as how these physical components are wired together.

This can be implemented using defined configurations so that the involved components can either just be listed, or the presence of a required component can be observed without any specification (e.g., observing the existence of a partner node in a two-node cluster that is implemented using private direct links). This approach is reasonable for small, simple configurations, and can be implemented using just the original (logical view) node list. In this case, in addition to specifying the set of potential member nodes for the cluster, the cluster definition (i.e., the cluster configuration repository/file) may (optionally) be enhanced to also identify independent interconnect components like switches in terms of their address/identity on the management network.

It should be noted that changing the format of the cluster configuration definition (file/repository) may imply changes to an existing clustering framework that supports multiple interconnect fabric solutions. Hence, in order to avoid introducing changes that are not backwards compatible, or that represents mixing a pure logical cluster-membership view with a new physical view that also include interconnect resources, it is better to keep the list of interconnect equipment separate from the cluster host/node member repository. However, the logical view node-list can be used as input to a run-time tool that constructs a physical view based on the list of potential members. This is a much better approach in terms of separating the (logical view) cluster definition from the associated (physical view) interconnect infrastructure. The net result should in any case be that the physical cluster configuration is defined as list of nodes (host names/IP addresses—for both hosts and fabric components) on the corresponding management network.

For larger configurations, the list of components can be augmented by a map that identifies how the components are to be connected. For larger systems that also have to adapt to dynamic changes, a pre-defined map listing specific component instances is not very practical. In such a case, system construction can be based on guide-lines as to how the connectivity should be implemented, and then an operator can wire up the system and receive feedback that verifies that the operations have been performed correctly and, if not, how to fix it.

In order to enhance the ability to correlate connectivity information, it is possible to include the corresponding management network address as basic information available via the in-band path. In this way, basic exploration of the in-band connectivity (i.e., remote side of the various point-to-point links) will identify the corresponding out-of-band management access points (IDs/addresses). This implies that the entire population of both end nodes and switch components (e.g., the corresponding management addresses and/or component IDs) can be distributed via the management network to all components that are supposed to be part of the cluster.

Components that have problems with in-band connectivity can report this information via the out-of-band management network and make the information available for retrieval as well as for active event reporting, if relevant. Components that have operational in-band connectivity but have problems with the out-of-band management access can report this via the in-band management information.

Information retrieval/exchange can take place explicitly using additional SMA vendor attributes for InfiniBand components. However, optionally a more flexible approach is to provide an IP based point-to-point link that in the InfiniBand case can be implemented using Direct Routed Vendor SMPs when the corresponding InfiniBand link has not been configured/initialized for normal operation. IP links that are based on Direct Routed SMPs have the advantage that they are independent of subnet manager operation, and in general work the same way before, during and after IB subnet initialization.

It is desirable to be able to provide in-band communication between neighbor components within an InfiniBand fabric before the fabric has been configured by a subnet manager. In such a case, the use of Direct Routed Vendor SMPs is an option. However, being restricted to only using Direct Routed Vendor SMPs may limit the ability to utilize InfiniBand components that do not provide the required support for Direct Routed Vendor SMPs.

Accordingly, an alternative is to perform a partial initialization (i.e., only initializing the two neighbor ports), so that all supported InfiniBand data and management traffic can take place across the link. As with the Vendor SMP approach, in some cases this initialization can be hidden from any active Subnet Manager that is controlling the fabric so that the link will not be observed/considered as long as it is not supposed to be included in the fabric configuration.

With this approach, it is also straight forward to include side-band based communication as a medium for a point-to-point IP link and/or more basic information retrieval. InfiniBand already defines Baseboard management operations that include the ability to access remote IB-ML (I2C based) devices/information via a proxy agent associated with the InfiniBand port. This enables both low level I2C access to basic devices like temperature sensors, but also allows peer-to-peer type communication between service processors or other intelligent end-points that may be operating in auxiliary power mode, or that do not have direct access to any InfiniBand port. Using suitable packet formats, "IP over serial" type communication between such end-points can be implemented, even if the intermediate Baseboard agent proxy has not been explicitly designed for such a feature. Further, as a consequence of the definition of I2C based side-band access as part of the PCI-Express card/slot connector standards, the standardization of cabling for PCI-Express includes a physical link reserved for I2C traffic. Hence, if the same approach is used for InfiniBand, the ability to provide IP based peer-to-per traffic in only auxiliary power mode extends also across cables. The advantage in this case is both that there is no need for bulk-power in order to bring up an IB link, and also that communication is possible even if there is a fault associated with the IB port on either side.

Use of IP based point-to-point connections above either in-band and/or side-band "channels" allows communication among the neighbor nodes as the most basic feature. However, it also provides additional redundancy for the out-of-band interfaces for the various nodes. Using either conventional IP routing techniques and/or multi-hosting mechanisms and packet forwarding at the NIC driver level, it is possible to allow the out-of-band traffic of one node be implemented by the out-of-band channel of another node (i.e. either explicitly using IP routing mechanisms or transparently using multi-hosting techniques and/or IP address failover and migration mechanisms). In this way, the implementation of the management network effectively utilizes all possible out-of-band, side-band and available in-band channels to provide the highest possible chance of connectivity from any particular node, fabric component or management server/station to the common management network. Also, by making sure that such communication can be handled between neighbor ports within the fabric (i.e., ports connected by a single in-band and/or side-band link), it is possible to implement such communication independently of whether the fabric itself has been fully initialized. In the InfiniBand case, this implies that there is no dependency on any subnet manager having initialized the subnet.

Also, it is possible to keep point-to-point based IP links operational even if the subnet and/or the corresponding link gets re-initialized by a subnet manager. For example, when the point-to-point IP link is implemented using direct-routed (source routed) Subnet Management Packets (SMPs), the operation of the IP link is independent of any concurrent Subnet Manager operation. Also, even if normal LID routed packets are used, it is possible to monitor the LID assignments for the node (IB management port) on each side of the link, and thereby dynamically adapt to changing LID assignments over time due to Subnet Manager based subnet re-initialization. IP links based on Direct Route SMP paths may span a single IB link or multiple IB links. For example, a single management server may have point-to-point IP links to all nodes connected to the IB fabric. The various links may have variable lengths depending upon the number of links that have to be traversed between the management server and the relevant node.

By applying one or more of the mechanisms outlined above, software/firmware on each host and/or on each switch node can observe local connectivity and has the option of correlating the observed in-band (or side-band) connectivity with the cluster definitions and/or the rules for connectivity that have been defined for the local component as well as the complete system. Based on this information it can be determined to what extent the required physical connectivity has been established, and it can also be decided what the correct logical configuration should be. This information can in principle be obtained by a dedicated management host or a switch management unit instead of (or in addition to) one or more ordinary member hosts.

The desired configuration (system blueprint) can be defined once and then be distributed to the various components as pre-defined (per component) blueprint configurations. Alternatively, the detailed blueprint information is not distributed, but instead a central management server may collect connectivity information from the various components, and may then check/correlate the real world connectivity with what has been defined in the blueprint description. The set of generic blueprints may be predefined as part of the host and switch fabric management software or firmware, but may also be dynamically described using a suitable notation (e.g., a graph representing connected port types). In addition to the generic blueprint information (e.g., what kind of ports can be connected to how many, and potentially which ports on which components), it is also possible to include specific configuration information in terms of the exact identity that should be observed on the remote side of which links. When, for example, cluster membership changes, then the identity information can be updated without changing the generic rules.

In cases where incorrect connectivity has been determined, the autonomous and detailed knowledge can allow the system to instruct a relatively unskilled operator to perform the required corrections of connectivity. For small configurations, the number of different ways connectivity can be implemented may be small enough to allow the system to first be constructed and then be verified relative to one or a few possible pre-defined configurations. However, for large configurations the configuration goals can be defined in advance, and the construction of the configuration can be checked "during" the construction process. In order to accomplish this, a target configuration and the involved components can be identified. For large systems, it may also be appropriate to register the geographical location of the various components. Based on the target configuration, the role of the various components can then be decided. This can be based on administrative input, or it can take place automatically by a configuration tool that in addition to the list of component and the target configuration might also take the physical location of the various components into account in order to make an optimal role assignment to the various components.

In some environments, RFID and/or BAR-code technology may be used to both identify components (e.g., physical chassis/enclosure instances) as well as their geographical locations without any need for additional administrator input. During the construction process, it is important that the involved components are powered-on and operational, so that all involved components and established connectivity can be checked immediately, but without being made generally available for applications. In particular, this may imply that pairs of nodes (end-nodes or switch-nodes) that are connected by a single physical link (cable/trace) are powered on during the time the associated link is tested.

Where involved components and connectors have service indicators (e.g., LED-based service indicators), the system can be arranged to give immediate feedback to an operator about the conditions such as:

the connection has been detected; or no connection has been detected.

Assuming connection has been detected, additional information can then be provided, such as:

the physical link seems to be fully operational;

the physical link seems to not be fully operational (or not to be stable);

the connection is stable enough to identify both the associated end-points, and the connection is in line with the target configuration (it should be noted that this does not indicate a stable physical link);

the connection is stable enough to identify both the associated end-points; and the connection is not in line with the target configuration (it should be noted that this does not indicate a stable physical link).

The ability to identify a unique cable identity (e.g., a serial number) on both sides of a connection can facilitate trouble shooting and increase the ability to provide information regarding the state of a cable connection.

In cases where explicit information is available about cable identity, it is possible to enhance the state information in order to reflect cable presence and cable identity determination explicitly in addition to the information outlined above. By utilizing the existence of both a link-indicator LED as well as a port (connector) location indicator LED for each physical (cable) connector, it is possible to enable a human operator to be provided information readily to be able to distinguish between various states, for example using blink patterns and frequencies. In addition to LED based information, the same status information can be available via relevant system management interfaces at both chassis and cluster level (e.g., as console notification messages and CLI based status queries). The relevant information can also be presented to a system administrator/operator via a hand-held device (e.g. a PDA, etc.) that can be used also when handling cabling and physical connectivity and access to standard console devices is not possible. In the case where an operator claims correct physical connectivity, but the system can not verify this, special diagnostic operations can be coordinated between relevant components via the management network without any need for additional input from the operator. Further, if a problem can not be diagnosed directly, the system can instruct the operator to try out alternative connectivity based on the system's knowledge about what ports are currently unused. If no other un-used ports exist, then the system can make one available by moving away normal traffic and instruct the operator to use the allocated port. Also, in the case where connectivity is lost during run-time, the system may negotiate setup of special diagnostic operations by communicating via the management network (potentially utilizing alternative in-band/side-band channels as outlined above) with the two components that owns the relevant fabric ports.

By filtering all fabric related error events through a single (proxy) event reporter engine that keeps track of the current configuration, individual events that are related can be correlated and a single (aggregated) fabric level event can be generated (e.g. by providing a single event about a link between port x and y that has failed rather than separate link failure events for port x and y on component X and Y respectively).

In the case of InfiniBand, it is possible to correlate events from the Subnet Manager with events from the various individual components in order to present the operator with a single view of the system that combines the (physical) view of the individual components with the (logical) view of the Subnet Manager.

At a higher level, information about individual link (or component) problems can be translated into information about loss of connectivity between end-nodes, for example by being correlated to what is observed by the generic clustering framework).

An example embodiment of the invention can provide for integration of traditional cluster membership information with information about interconnect fabric topology and connectivity in a way that provides a very simple administrative model for small to medium sized clusters. For very large configurations, all aspects of physical connectivity can be handled independent of the logical cluster level connectivity and can also make full use of any available in-band, out-of-band and side-band based communication links, both between peer components and between cluster/fabric components and dedicated management components. As a result, a simple administrative model can be employed even for clusters with thousands of nodes. Also, in the case of problems (component faults or incorrect connectivity between components), an example embodiment can ensure that all relevant information can be extracted automatically from all relevant components, and then be aggregated and presented to an administrator in a "holistic" way. This can be achieved by addressing relevant system level aspects as opposed to just providing the component level aspects and leaving it up to a human administrator to infer the system level implications.

In an operational cluster configuration, all components (both hardware, firmware and software) can be arranged to be compatible (i.e. both within a single subsystem as well as between various cluster nodes and interconnect components). In view of this, the definition of a valid cluster configuration can include such aspects as well as the basic connectivity rules. In other words, information defining a status of the cluster can include information about one or more or all of hardware types and revisions, firmware types and revisions and software types and revisions As with connectivity information and associated (blueprint) rules, checking can either be based on distributing the relevant information to the relevant components (e.g. to the corresponding service processor(s) and/or operating systems), or retrieving relevant version information from the various components and gathering and checking this in a central management server. For example, a system component can be configured to observe information about types and revisions of one or more or all of software, firmware and hardware and to correlate this information with configuration rules defined for that component.

It should be noted that the same type of sub-component (e.g. a switch chip) may require different firmware type or revision depending on the context it is used in (e.g. when used on a single switch leaf switch, the required firmware image may be different than when the same switch type is used on the fabric cards of a multi-stage core switch).

An example embodiment of the this aspect of the invention can ensure that both out-of-band management network interfaces as well as a cluster interconnect fabric ("data network") as well as any associated side-band channels and also any other available status information about cable presence, cable identity etc, can be utilized in a fully synchronized and potentially redundant way (i.e., any operational communication path can be used to extract status) in order to determine the overall connectivity and status of the cluster.

Another aspect of an invention described herein provides a system of multiple chassis instances interconnected via cables representing various communication media types and with the ability to perform IP based management traffic transparently over a range of such media types. An example of such a system can provide fail-over scenarios between different media types between two chassis instances as well as the ability of one chassis to "export" it's management IP address via interfaces provided by another chassis instance.

Although the embodiments above have been described in considerable detail, numerous variations and modifications will become apparent to those skilled in the art once the above disclosure is fully appreciated.

What is claimed is:

1. A system comprising:
    a cluster of system components interconnected by a cluster interconnect fabric, the system components further comprising a processor and out-of-band management network interfaces to an out-of-band management network;
    wherein the system components in the cluster are mechanically coupled to other system components in the cluster through a plurality of cables, wherein each cable of the plurality of cables comprises a cable connector at each end point of the cable, wherein at least one cable connector in each cable is located at an interface of the cluster interconnect fabric, and wherein the at least one cable connector further includes a data storage module and a connector logic;
    wherein the system is configured to use the cluster interconnect fabric and the out-of-band management network interfaces to determine an overall connectivity and status of the cluster; and
    wherein determining the overall connectivity of the cluster involves determining a physical view that identifies system components in the cluster, wherein the physical view also identifies how the system components in the cluster are mechanically coupled to the other system components in the cluster through the plurality of cables by using at least one unique cable identity that is stored in the data storage module in a cable connector in each cable of the plurality of cables and received from the connector logic in the cable connector in each cable of the plurality of cables.

2. The system of claim 1, further configured to use any associated side-band channels to determine the overall connectivity and status of the cluster.

3. The system of claim 1, further configured to use available status information about at least one of cable presence and cable identity to determine the overall connectivity and status of the cluster.

4. The system of claim 1, wherein information defining the status of the cluster includes information about one or more or all of hardware types and revisions, firmware types and revisions and software types and revisions.

5. The system of claim 1, wherein a management network address is made available via an in-band path whereby in-band connectivity information identifies corresponding out-of-band management access points.

6. The system of claim 1, wherein components can communicate selectively via an in-band path or an out-of-band path.

7. The system of claim 1, comprising at least one IP point to point link configured by sending Direct Routed SMP packets via at least one InfiniBand link segment.

8. The system of claim 1, wherein a system component is configured to observe local connectivity and to correlate observed in-band connectivity with configuration rules defined for the component and/or the system for determining whether a required physical connectivity has been established.

9. The system of claim 1, wherein a system component is configured to observe information about types and revisions of one or more or all of software, firmware and hardware and to correlate this information with configuration rules defined for that component.

10. The system of claim 1, wherein a system component is configured to observe local connectivity and to correlate observed in-band connectivity with configuration rules defined for the component and/or the system for determining a desired logical configuration.

11. The system of claim 10, wherein the configuration rules are at least one of predefined and defined dynamically.

12. The system of claim 1, wherein the system is configured to perform distributed checking of one or more or all of connectivity, hardware types and revisions, firmware types and revisions and software types and revisions, relevant rules being distributed to individual system components that are operable to compare local status against the relevant rules.

13. The system of claim 1, wherein the system is configured to perform centralized checking of one or more or all of connectivity, hardware types and revisions, firmware types and revisions and software types and revisions, a central management server being operable to collect connectivity information from relevant system components and to compare the collected information against relevant rules.

14. The system of claim 1, wherein identifying how the system components in the cluster are mechanically coupled together involves identifying a set of ports for the system components, wherein each identified port is an endpoint for a physical link for the system components that are mechanically coupled together.

15. The system of claim 1, wherein the data storage module for each cable connector comprises at least one of a serial number, a type, and a length for the corresponding cable.

16. A system comprising:
at least two subsystems, each of the at least two subsystems includes a processor, wherein the at least two subsystems are interconnected by a cluster interconnect fabric, the system being operable to perform IP based management traffic transparently over a range of media types;
wherein the at least two subsystems are mechanically coupled to each other through a plurality of cables, wherein each cable of the plurality of cables comprises a cable connector at each end point of the cable, wherein at least one cable connector in each cable is located at an interface of the cluster interconnect fabric, and wherein the at least one cable connector further includes a data storage module and a connector logic;
wherein the system is configured to use the IP based management traffic to determine an overall connectivity and status of the subsystems; and
wherein determining the overall connectivity of the at least two subsystems involves determining a physical view that identifies the at least two subsystems, wherein the physical view also identifies how the at least two subsystems are mechanically coupled to each other through the plurality of cables by using at least one unique cable identity that is stored in the data storage module in the cable connector in each cable of the plurality of cables and received from the connector logic in the cable connector in each cable of the plurality of cables.

17. The system of claim 16, operable to use the physical view to provide fail-over scenarios between different media types between two chassis instances.

18. The system of claim 16, wherein a subsystem is operable to export a management IP address for the subsystem via an interface provided by another subsystem, wherein the other subsystem includes a processor.

19. A method of configuring a system comprising a cluster of system components interconnected by a cluster interconnect fabric, wherein the system components further comprise out-of-band management network interfaces to an out-of-band management network, the method comprising:
using the cluster interconnect fabric and the out-of-band management network interfaces to determine an overall connectivity and status of the cluster;
wherein the system components in the cluster are mechanically coupled to other system components in the cluster through a plurality of cables, wherein each cable of the plurality of cables comprises a cable connector at each end point of the cable, wherein at least one cable connector in each cable is located at an interface of the cluster interconnect fabric, and wherein the at least one cable connector further includes a data storage module and a connector logic; and
wherein determining the overall connectivity of the cluster involves determining a physical view that identifies system components in the cluster, wherein the physical view also identifies how the system components in the cluster are mechanically coupled to the other system components in the cluster through the plurality of cables by using at least one unique cable identity that is stored in the data storage module in the cable connector in each cable of the plurality of cables and received from the connector logic in the cable connector in each cable of the plurality of cables.

20. A non-transitory computer readable medium comprising program instruction operable to control one or more processors to configure a system comprising:
a cluster of system components interconnected by a cluster interconnect fabric;
wherein the system components in the cluster are mechanically coupled to other system components in the cluster through a plurality of cables, wherein each cable of the plurality of cables comprises a cable connector at each end point of the cable, wherein at least one cable connector in each cable is located at an interface of the cluster interconnect fabric, and wherein the at least one cable connector further includes a data storage module and a connector logic;

wherein the system components further comprise out-of-band management network interfaces to an out-of-band management network;

wherein configuring the system includes using the cluster interconnect fabric and the out-of-band management network interfaces to determine the overall connectivity and status of the cluster; and wherein determining the overall connectivity of the cluster involves determining a physical view that identifies system components in the cluster, wherein the physical view also identifies how the system components in the cluster are mechanically coupled to the other system components in the cluster through the plurality of cables by using at least one unique cable identity that is stored in the data storage in a cable connector in each cable of the plurality of cables and received from the connector logic in the cable connector in each cable of the plurality of cables.

* * * * *